US007431146B2

(12) United States Patent
Reuteler et al.

(10) Patent No.: US 7,431,146 B2
(45) Date of Patent: Oct. 7, 2008

(54) CARTON FEEDING AND FORMING MACHINE WITH SELECTIVELY ACTUATED LUGS AND RELATED METHODS

(75) Inventors: Urs Reuteler, Atlanta, GA (US); Charles Ray Landrum, Dunwoody, GA (US)

(73) Assignee: Kliklok Corporation, Decatur, GA (US)

( * ) Notice: Subject to any disclaimer, the term of this patent is extended or adjusted under 35 U.S.C. 154(b) by 0 days.

(21) Appl. No.: 11/737,378

(22) Filed: Apr. 19, 2007

(65) Prior Publication Data

US 2007/0191201 A1 Aug. 16, 2007

Related U.S. Application Data

(63) Continuation of application No. 10/532,528, filed as application No. PCT/US03/34067 on Oct. 27, 2003.

(60) Provisional application No. 60/492,161, filed on Aug. 1, 2003, provisional application No. 60/421,461, filed on Oct. 25, 2002.

(51) Int. Cl.
*B65G 19/26* (2006.01)

(52) U.S. Cl. ...................................... 198/732; 198/731

(58) Field of Classification Search ................. 198/725, 198/728, 730, 732, 733
See application file for complete search history.

(56) References Cited

U.S. PATENT DOCUMENTS

| | | | | | |
|---|---|---|---|---|---|
| 1,740,582 | A | * | 12/1929 | Farmer | 198/732 |
| 2,937,553 | A | | 5/1960 | Sherman | |
| 4,499,990 | A | | 2/1985 | Fishback | |
| 4,505,093 | A | * | 3/1985 | Johnson | 198/732 |
| 5,501,318 | A | * | 3/1996 | Disrud | 198/732 |
| 6,378,693 | B1 | * | 4/2002 | Ballestrazzi et al. | 198/732 |
| 6,662,933 | B2 | * | 12/2003 | De Guglielmo et al. | 198/732 |
| 7,017,733 | B2 | * | 3/2006 | Pfankuch | 198/731 |
| 2001/0032775 | A1 | * | 10/2001 | Guglielmo et al. | 198/732 |

* cited by examiner

*Primary Examiner*—James R Bidwell
(74) *Attorney, Agent, or Firm*—King & Schickli, PLLC

(57) ABSTRACT

A machine for intended use in feeding and completing a partially formed carton is disclosed. In one embodiment, the machine includes an overhead conveyor with selectively actuated, depending lugs that engage and convey the carton in a first direction while a first flap on a lid is folded and sealed. The lugs on each conveyor may be closely spaced or overlapping to allow for selective actuation at a desired instant without the need for timing the corresponding chain or the carton feed to the machine. A diverter located at a transition between the forward and return runs of the overhead and takeaway conveyors actuates the lugs in a controlled fashion. Related methods of feeding and forming cartons are also disclosed.

23 Claims, 24 Drawing Sheets

CARTON FEEDING AND FORMING MACHINE WITH SELECTIVELY ACTUATED LUGS AND RELATED METHODS

This application is a continuation of U.S. patent application Ser. No. 10/532,528 filed Oct. 7, 2005, which is a national stage of International Application PCT/US03/034067 filed Oct. 27, 2003, which claims the benefit of U.S. Provisional Patent Application Ser. Nos. 60/421,461 filed Oct. 25, 2002, and 60/492,161 filed Aug. 1, 2003, the disclosures of which are all incorporated herein by reference.

FIELD OF THE INVENTION

The present invention relates to the carton handling art and, more particularly, to a machine for feeding a partially formed and filled carton while closing one or more flaps to complete the carton.

BACKGROUND OF THE INVENTION

Machines for feeding and completing partially formed and filled, top-loaded paperboard cartons are well known in the art. For many years, the most efficient approach for the high speed feeding and forming of such cartons, including closing the lid and sealing the corresponding flaps, was a continuous or in-line one. An early example of this approach is found in commonly assigned U.S. Pat. No. 3,267,637 to Baker, which is incorporated herein by reference. The machine disclosed in this patent uses fixedly mounted, upstanding lugs or "pushers" carried by spaced parallel chains to convey the carton. Specifically, after folding of the lid and pre-folding of the trailing end flap, the lugs push the carton along while folding and sealing of the front flap on the lid simultaneously occurs. Pushing from the trailing end of the carton advantageously helps to maintain the lid in the proper registration during folding and sealing of the front flap. To fold the opposite side flaps in an efficient manner, the carton with the folded and partially sealed lid is then turned about its vertical axis while forward feeding continues. After turning, tie carton is conveyed in-line by upstanding lugs of a downstream conveyor while the side flaps are sealed, thus completing the carton.

A more modern "lugless" example of the continuous carton forming approach is found in commonly assigned U.S. Pat. No. 5,660,262 to Landrum et al., the disclosure of which is also incorporated herein by reference. In this approach, infeed belts frictionally engage the top and bottom surfaces of the carton for conveying while the front flap is sealed. This eliminates the need for pre-folding The trailing end flap to avoid damaging it, as is required when using upstanding lugs. After the front flap is sealed, the carton enters a zone including a plurality of spaced parallel belts running at different speeds that complete the turning through 90°. The turned carton is then received and conveyed by spaced belts while the opposite side flaps are folded and sealed. The carton is thus formed in a continuous fashion without stopping or changing the conveying direction.

While these continuous or in-line approaches have enjoyed considerable commercial success, there are certain disadvantages. For instance, running plural spaced belts at different speeds to turn the carton during feeding increases the complexity of the machine. Morever, to achieve turning through 90 degrees while continuously conveying the carton, the machine must have a relatively great longitudinal dimension. This requirement can present difficulties where floor space is limited. Maintenance costs are also increased in view of the need for ensuring that the differential speeds of the belts are in the proper relationship for turning the carton in the desired fashion. In the modern approach using spaced top and bottom running belts to feed the carton while the front flap is sealed, the differential force created on the opposite surfaces of the carton must also be kept in check, as it can lead to mis-registration of the lid or closure. The problem with mis-registration is especially prevalent during high speed conveying, which of course is a desirable mode of operation to maximize productivity.

As suggested above, others in the past have avoided the mis-registration problem by employing spaced conveyors with fixed, upstanding lugs for engaging and pushing the carton from along the trailing end. In this arrangement, the conveyor speed is selected to ensure that the upstanding lugs reach the trailing end of the carton at the desired instant in time. The Baker '637 patent is representative of this approach. However, the more modern types of "pusher" conveyors include selectively extendable lugs capable of moving from a retracted position to an actuated position for engaging and conveying the carton. In either case, pushing a top-loaded carton from along the trailing end using lugs helps to ensure the lid or closure is maintained in proper registration. Consequently, keeping the carton conveying speed in check may be unnecessary using this type of arrangement.

Although the use of extensible lugs solves the timing problems associated with fixed lugs and the mis-registration problems that may result from using spaced belt conveyors, all known prior approaches employ lugs attached to the associated chain at fixed intervals generally selected to correspond to the length of the cartons in the conveying direction. This lug-to-lug spacing serves as a significant limitation on the operating speed or throughput of the machine. This is because, unless the actuated lug reaches the trailing end of the carton at the exact instant of introduction, a significant delay may occur while this lug catches up (or the next-in-line actuated lug reaches the carton, in the case where the preceding actuated lug has already passed). In relative terms, this resulting delay may be substantial, especially when the length of the carton in the conveying direction only slightly exceeds the fixed pitch distance of the lugs. Resolving this problem requires precisely timing the feeding of the cartons to the machine, but this complicates matters and does not allow for use in an arrangement where the carton feed is random.

Additionally, past and current mechanisms used to actuate extensible lugs are somewhat obtuse and inefficient. In the usual case, the lug traveling along the forward run immediately extends into the conveying path in a single, hurried movement and retracts in this same fashion. As a result, it often interferes with the proper conveyance of the cartons, and dictates maintaining a large space between them (which deleteriously either decreases the throughput or increases the footprint/size of the machine). Once pivoted, many conventional types of lugs also lock in the actuated position and a pivot block, cam or like structure is required to actively engage and return the actuated lug to the retracted position. This requirement adds to the overall complexity, which directly correlates to both the manufacturing and maintenance costs.

Accordingly, a need exists for an improved carton feeding and forming machine that overcomes the foregoing limitations and others. A need is also identified for an improved conveyor with selectively actuated lugs having a small "pitch" (such as, for example, a center-to-center spacing less than the width of a lug in the conveying direction). A selected one of such closely spaced lugs could be actuated at a desired instant in time for engaging a carton or other object, thus making such an arrangement better adapted for use in conveying cartons of varying lengths or introduced in a random fashion. As demonstrated herein, the use of such lugs in a carton feeding and forming machine would provide a number of benefits, including but not limited to a vast improvement in efficiency, reliability, and accuracy of operation with a concomitant reduction in operating and maintenance costs.

SUMMARY OF THE INVENTION

In accordance with a first aspect of the invention, a machine for conveying a carton including a lid having at least one flap along a path is disclosed. The machine comprises an overhead conveyor including at least one first lug selectively movable to a depending position for engaging and conveying the carton in a first direction. A takeaway conveyor adjacent to the overhead conveyor includes at least one second lug. This second lug is selectively movable to an upstanding position for engaging and conveying the carton in a second direction generally perpendicular to the first direction. Means for folding the at least one flap as the carton is conveyed along the path by the overhead conveyor or the takeaway conveyor is also provided.

In one embodiment, the first lug of the overhead conveyor pivots between a retracted position overlying the conveying path and the depending position for engaging the carton. The takeaway conveyor may include a pair of generally parallel conveyor chains, each including at least one second lug. Each second lug is preferably a pop-up lug movable between a retracted position below the conveying path and an upstanding position. The machine may further include a rotatable wheel having at least one projection for at least partially closing the first flap before or during the engagement with the depending lug.

The means for folding the at least one flap may be associated with the overhead conveyor, and may include a stationary plow over which the flap passes and at least one roller wheel for completing the folding in association with the plow. The carton may further include second and third flaps, and means for folding the second and third flaps may be positioned along the takeaway conveyor. The means for folding the second and third flaps may include a stationary plow over which each of the second and third flaps pass and at least one roller wheel for completing the folding of each of the second and third flaps in association with the corresponding plow. Means for applying or activating an adhesive for sealing the first, second, and third flaps may also be provided.

In accordance with a second aspect of the invention, a machine for conveying and at least partially folding a flap associated with a trailing end of a carton is disclosed. The machine comprises a rotatable wheel having at least one radially extending projection for engaging and at least partially folding the flap. An overhead conveyor including at least one lug selectively movable to a depending position engages the trailing end of the carton once the flap is at least partially folded by the projection and conveys the carton in a conveying direction. The partial folding by the wheel helps to prevent the flap from being damaged by the depending lug upon engagement.

In one embodiment, the overhead conveyor includes a pair of parallel conveyor chains. Each chain carries a plurality of lugs independently and selectively movable to the depending position. To permit selective actuation at a desired instant in time, such as for engaging the carton as it is introduced to the machine, the lugs associated with each chain may overlap with each other in the conveying direction. Such overlapping lugs thus create the desirable small pitch.

The rotatable wheel preferably includes a plurality of radially-extending projections. An upstream sensor senses the location of the carton and generates a corresponding signal. This signal is used to actuate the wheel such that the projection engages the flap at the appropriate instant in time to avoid damaging the carton.

A support surface is provided along which the carton is conveyed by the overhead conveyor, and a takeaway conveyor engages and conveys the carton upon exiting the overhead conveyor. Preferably, the takeaway conveyor is generally perpendicular to the overhead conveyor, and may include a pair of parallel conveyor chains. Each chain may include a plurality of lugs independently and selectively movable to an upstanding position for engaging and conveying the carton. Besides a takeaway conveyor, an infeed conveyor may be provided for feeding randomly received cartons to the overhead conveyor at a substantially constant speed.

In accordance with a third aspect of the invention, a conveyor for conveying a carton is disclosed. The conveyor comprises an endless chain having at least one pivotally mounted lug. The chain is driven in a conveying direction along an endless path including a forward run, a return run, and a first transition from the forward run to the return run. A guide structure positioned at least partially along the forward run or return run includes a first surface and a second surface. A pivoting finger elongated in the conveying direction is provided along the first transition. The finger includes a first, home position for allowing the at least one lug to pass in a retracted position and a second position for selectively guiding at least a portion of the lug into engagement with the second surface. The second surface of the guide structure is specially contoured to gradually move the lug to an actuated or operative position for engaging or conveying the carton.

In one embodiment, the finger is tapered and includes opposed surfaces for engaging the portion of the lug. A rotary solenoid is also provided for pivoting the finger between the first and second positions. The portion of the lug may be a transverse tab having: (1) a generally flat first face for engaging the finger in the second position and the second face of the guide structure; and (2) an inclined second face for engaging the finger in the first position and the first surface of the guide structure. The engagement with the diverter in the second position pivots the lug approximately 10° before engaging the second surface of the guide structure. The engagement with the second surface of the guide structure may pivot the lug approximately 50°.

The lug includes a slot for receiving a pin associated with the conveyor chain. The slot defines a maximum range of pivoting movement for the lug. Preferably, the lug is adapted for engaging a leading end of the carton being conveyed. However, the lug may also be adapted for engaging a trailing end of the carton being conveyed.

In accordance with a fourth aspect of the invention, a driven conveyor for selectively engaging an object capable of moving in a conveying direction is disclosed. The driven conveyor comprises a plurality of lugs. Each lug is capable of moving from a normal position to an actuated position in which at least part of the lug extends in a generally vertical direction for engaging the object. The driven conveyor further includes a diverter for selectively diverting a selected lug in the normal position to the actuated position. To allow for selective actuation at a desired instant in time and desired location for immediately engaging a fleeting object, such as a carton, at least a portion of a first lug overlaps with at least a portion of a second, adjacent lug in one of the conveying direction or a direction generally transverse to both the conveying direction and the vertical direction when the first and second lugs are in the normal position.

In one embodiment, the lugs are structurally identical, and a distance from a corresponding point on each of the first and second lugs, or "pitch," in the normal position measured in the conveying direction is about 2.5 inches or less. Preferably, an endless chain carries and connects the lugs together. As a result of the close spacing, each foot of chain as measured in the conveying direction may include about five lugs (and, more specifically, 4.8 lugs).

With respect to the overlapping nature of the lugs, the portion of the first lug in the normal position may overlap with the portion of the second lug in the actuated position. The first lug maybe a leading lug or a trailing lug. Since the lugs overlap, two adjacent ones are spaced apart a distance no greater than a width of a single lug in the conveying direction when in the actuated position.

The part of each lug extending in the generally vertical direction is a pusher. The pusher has an engagement face adapted for engaging the object being conveyed. The engagement face is preferably generally perpendicular to the conveying direction when the corresponding lug is in the actuated position. The pusher of the first lug in the normal position may be the portion overlapping with the portion of the second lug in the conveying direction. In the normal position, the engagement face of each pusher is oriented at an acute angle relative to a generally horizontal plane, but is upstanding in the actuated position and may depend from the conveyor. The movement from the normal position to the actuated position is pivoting such that a point on the lug follows a generally arcuate path. Moreover, it is preferable that, once actuated, the lug passively returns to the normal position.

The diverter for actuating the lugs may include a tapered finger having opposed sides. A motive device such as a rotary solenoid rotates the finger between a first position and a second position. The diverter may further include a guide structure having a first surface and a second surface. The finger in the first position allows the lugs to pass in the normal position and in the second position selectively engages and guides a portion of the lug into engagement with the second surface.

The portion of the lug engaged by the diverter may include: (1) an inclined first face for engaging a first side of the finger in the first position and the first surface of the guide structure; and (2) a generally flat second face for engaging a second side of the finger in the second position and the second surface of the guide structure. The engagement with the second side of the finger pivots the selected lug approximately 10°. The engagement with the second surface of the guide structure pivots the selected lug approximately 50°. Each lug preferably includes a slot for receiving a pin associated with a chain interconnecting the lugs. The slot defines a maximum range of pivoting movement for the lug (e.g., 60°).

In accordance with a fifth aspect of the invention, a driven conveyor for selectively engaging an object capable of moving in a conveying direction is disclosed. The conveyor comprises a plurality of lugs, each capable of moving from a normal position to an actuated position in which at least part of the lug extends in a generally vertical direction for engaging the object. A diverter is provided for selectively diverting a selected lug in the normal position to the actuated position. To permit selective actuation at a desired instant in time and at a location for immediately engaging a fleeting object, each lug is spaced apart a distance no greater than a width of a single one of the lugs in the conveying direction when in the actuated position, and may even overlap.

In accordance with a sixth aspect of the invention, a driven conveyor for selectively engaging an object capable of moving in a conveying direction along a conveying path is disclosed. The conveyor comprises a plurality of lugs capable of moving from a normal to an actuated position such that a part of the lug extends vertically into the conveying path for engaging the object. A diverter elongated in the conveying direction and capable of moving from a first position to a second position is provided. The diverter engages and initiates movement of a selected lug to the actuated position. An actuator selectively moves the diverter toward the second position, and a guide structure maintains the selected lug in the actuated position for engaging the object. At least a portion of a first lug overlaps with at least a portion of the second lug in one of the conveying direction or a direction generally transverse to both the conveying direction and the vertical direction, when the first and second lugs are in a normal position.

In accordance with a seventh aspect of the invention, a system for sequentially receiving and conveying randomly spaced cartons moving along a conveying path is disclosed. The system comprises a conveyor including at least one chain driven in an endless path with a forward run extending at least partially along the conveying path. The chain includes a plurality of closely spaced first lugs adapted for selectively moving into the conveying path in an actuated condition to engage a next-in-line carton. A diverter positioned adjacent to the chain assumes a first, home position for allowing the lugs to pass or a second position for guiding a selected lug to the actuated condition. A sensor positioned adjacent the conveyor senses the next-in-line carton and generates a corresponding output signal. A controller uses the output signal to actuate the diverter to guide the selected lug to the actuated position, ready for engaging the next-in-line carton immediately upon entering the conveying path adjacent the forward run of the conveyor. As a result, efficient conveyance of the cartons is achieved without the need for matching the driving of the endless chain with the receiving of the cartons by the conveyor.

In one embodiment, the diverter comprises a tapered finger having opposed surfaces for engaging a portion of the selected lug and further including a motive device associated with the controller for pivoting the finger between the first and second positions. The chain includes a return run and a first transition from the forward run to the return run, with the finger being elongated in the conveying direction and located along the first transition. A guide structure is positioned at least partially along the forward run. The guide structure has a first surface and a second surface contoured to gradually move the lug to the actuated condition for engaging the next-in-line carton. The controller may include a dimension of the next-in-line carton in a conveying direction. As a result, a time interval until the next-in-line carton reaches a position for engagement by the selected lug is determined by the controller and used to determine the selected instant in time for actuating the selected lug.

Preferably, at least a portion of a first lug in said plurality of lugs overlaps with at least a portion of a second, adjacent lug in one of the conveying direction or a direction generally transverse to both the conveying direction and the vertical direction when the first and second lugs are in a non-actuated position. The conveyor is also preferably a first conveyor including first and second spaced chains, said first chain including the plurality of closely spaced first lugs and said second chain including a plurality of closely spaced second lugs capable of moving to an actuated condition for engaging the next-in-line carton. In that case, the diverter is a first diverter for guiding the selected first lug to the actuated condition for engaging the next-in-line carton; and further including a second diverter for simultaneously guiding a selected second lug of the second chain to the actuated condition for engaging the next-in-line carton.

The system may further include a takeaway conveyor having third and fourth spaced chains, each including at least one lug for engaging and conveying the next-in-line carton exiting the first conveyor. The takeaway conveyor is oriented such that the third and fourth chains of travel in a second direction at a right angle relative to the first and second chains of the first conveyor. Each lug on the third and fourth chains is a pop-up lug movable between a retracted position out of the conveying path and an upstanding position in the conveying path.

In another embodiment, the next-in-line carton includes at least one flap and further including means for folding the at least one flap while the carton is conveyed along the conveying path by the selected lug. The means for folding the at least one flap includes a first stationary plow positioned along the conveyor and at least one roller wheel for completing the folding in association with the plow. The carton may also include first, second, and third flaps, and the system may further include means for folding the second and third flaps positioned along a takeaway conveyor downstream from the conveyor. The means for folding the second and third flaps may comprise a stationary plow associated with each of the second and third flaps and at least one roller wheel for completing the folding of each of the second and third flaps in association with the corresponding plow. Means for applying or activating an adhesive for sealing the at least one flap may also be provided.

In accordance with an eighth aspect of the invention, a method of completing a partially formed carton including a lid having a first flap along a trailing end thereof is disclosed. The method comprises engaging and at least partially folding the first flap and conveying the carton with a lug depending from an overhead conveyor and in engagement with the at least partially folded first flap.

In one embodiment, the engaging step comprises contacting the first flap with a projection extending radially from a rotatably mounted wheel. The conveying step includes further folding of the at least partially folded first flap using the depending lug. In the case where the carton includes a second flap, the method includes the steps of folding and sealing the second flap while the carton is being conveyed by the depending lug. Likewise, when the carton includes a third flap, the method includes the step of sealing the first and third flaps after the depending lug is no longer in contact with the carton and while conveying the carton in a second direction generally perpendicular to a first direction in which the carton was conveyed by the depending lug. The engaging and partial folding steps may also comprise engaging the flap with the depending lug.

In accordance with a ninth aspect of the invention, a method of completing a partially formed carton including a lid having a first, second, and third flaps is disclosed. The method comprises: (1) conveying the carton in a first direction with the first flap at least partially folded while the second flap is sealed; and (2) conveying the carton in a second direction generally perpendicular to the first direction while the first and third flaps are sealed.

In one embodiment, the step of conveying the carton in the first direction comprises contacting the at least partially folded first flap with a lug depending from an overhead conveyor. The step of contacting the first flap with the depending lug may be completed after the first flap is partially folded by a rotatable wheel having a radially extending projection. The step of conveying the carton in the second direction may comprise contacting the carton with first and second upstanding lugs carried by each of first and second generally parallel, spaced endless chains.

In accordance with a tenth aspect of the invention, a method for conveying cartons along a conveying path is disclosed. The method comprises randomly feeding cartons to a conveyor including a first chain having a plurality of closely spaced first lugs, driving the chain in an endless path including a forward run adjacent the conveying path without regard to the position of a next-in-line carton, and actuating a selected first lug to engage the next-in-line carton upon entering the conveying path adjacent the forward run.

In one embodiment, the conveyor includes a second chain having a plurality of closely spaced second lugs, and the method further includes the step of actuating a selected second lug simultaneous with the actuation of the selected first lug. Also, the step of feeding cartons may comprise delivering the next-in-line carton at a substantially constant speed to the conveyor. In that case, the method further includes sensing a leading edge of the next-in-line carton and using a dimension of the next-in-line carton in the conveying direction and the substantially constant speed to determine when a trailing edge of the next-in-line carton is in a position along the conveying path adjacent the forward run for engagement by the selected lug.

BRIEF DESCRIPTION OF THE DRAWINGS

FIG. 3b is a front perspective view of the lug conveyor of FIG. 3a;

DESCRIPTION OF THE INVENTION

Figure 1A:
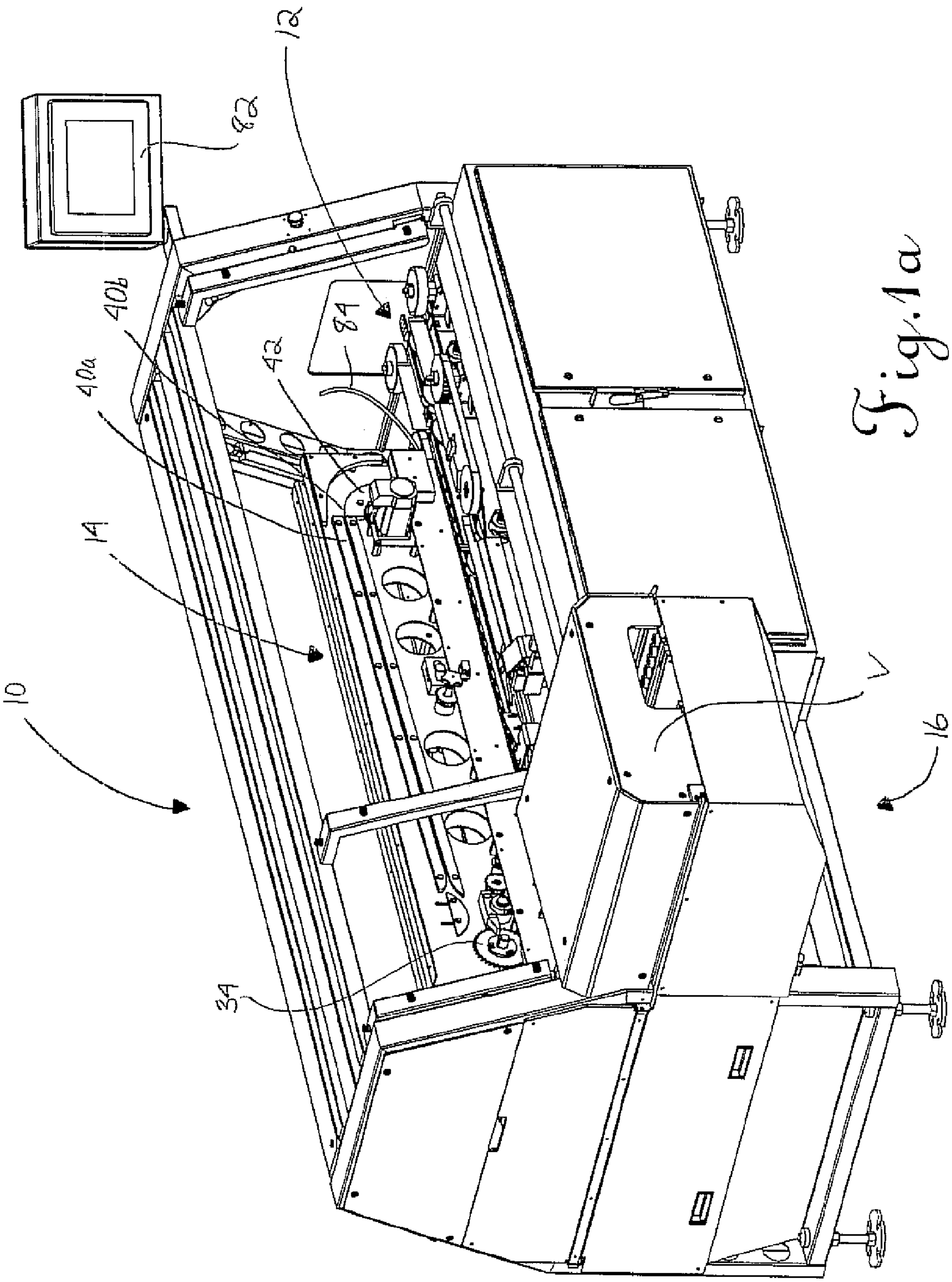
FIGS. 1a and 1b are overall perspective views of a carton feeding and forming machine.
Figure 1B:
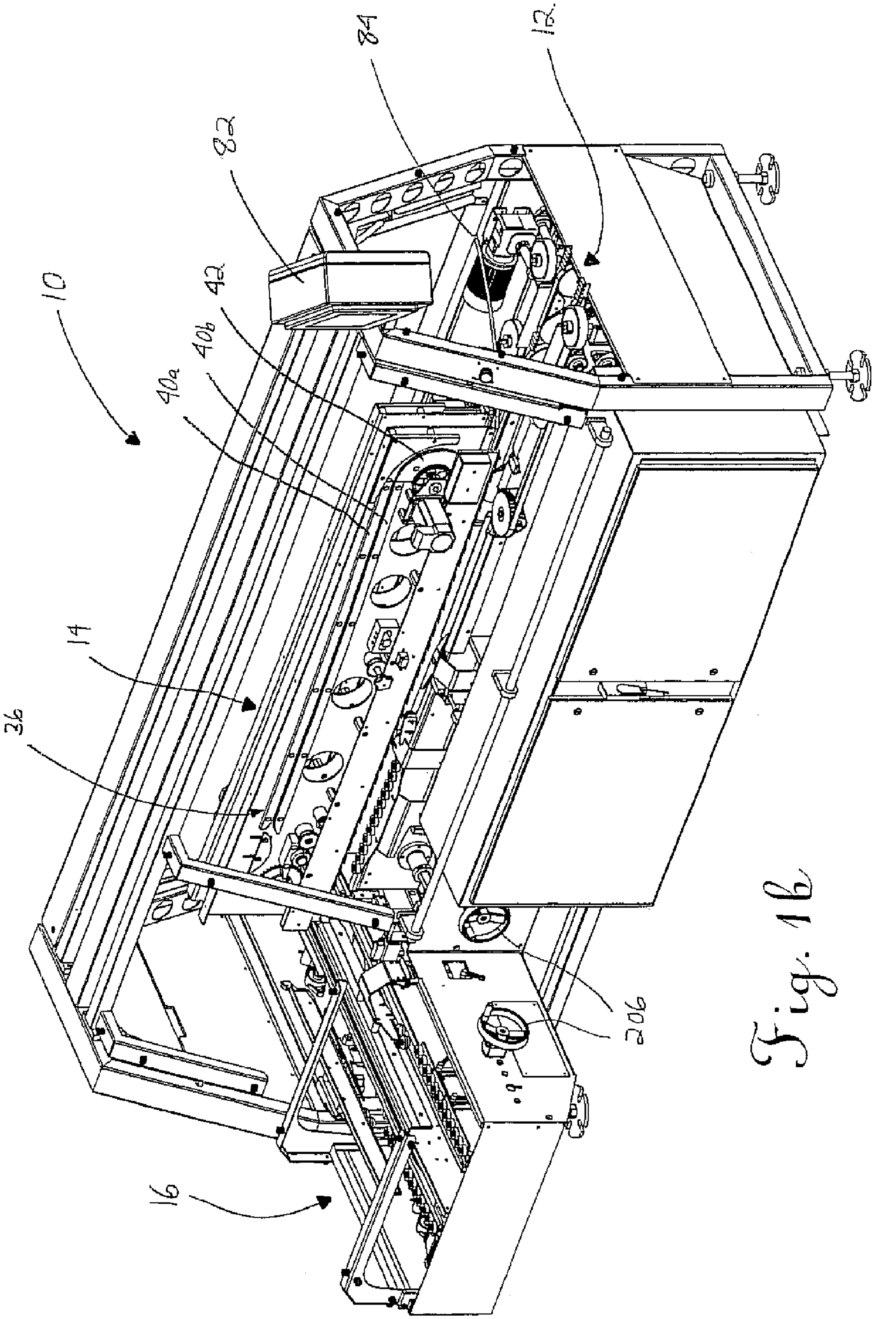

Making reference now to FIGS. 1*a* and 1*b* showing an overall perspective view of one embodiment of the machine 10 of the present invention. In the illustrated embodiment, the machine 10 includes an in-line infeed conveyor 12, a takeaway conveyor 16 (which is partially obscured by an optional cover V in FIG. 1*a*), and an overhead conveyor 14 intermediate the two conveyors 12, 16. The three conveyors 12, 14, 16 together a substantially horizontal conveying or flow path for objects being conveyed.

As will also be recognized by those of skill in the art, the machine 10 of the present invention is particularly useful in a cartoning line for the top-loaded style of cartons C including a lid L or closure having a front flap $F_1$ and generally opposed side flaps $F_2$, $F_3$ (see FIG. 1*c*) with hinges formed by score or fold lines K. A carton C of this type may be formed from a blank by an upstream forming apparatus (not shown, but see for example commonly assigned U.S. Pat. No. 5,177,930 to Harston et al., the disclosure of which is incorporated herein by reference). In the typical arrangement, the carton C with the lid L in an open position is filled with product while traveling between the forming apparatus and the infeed conveyor 12 of the machine 10.

Figure 2A:
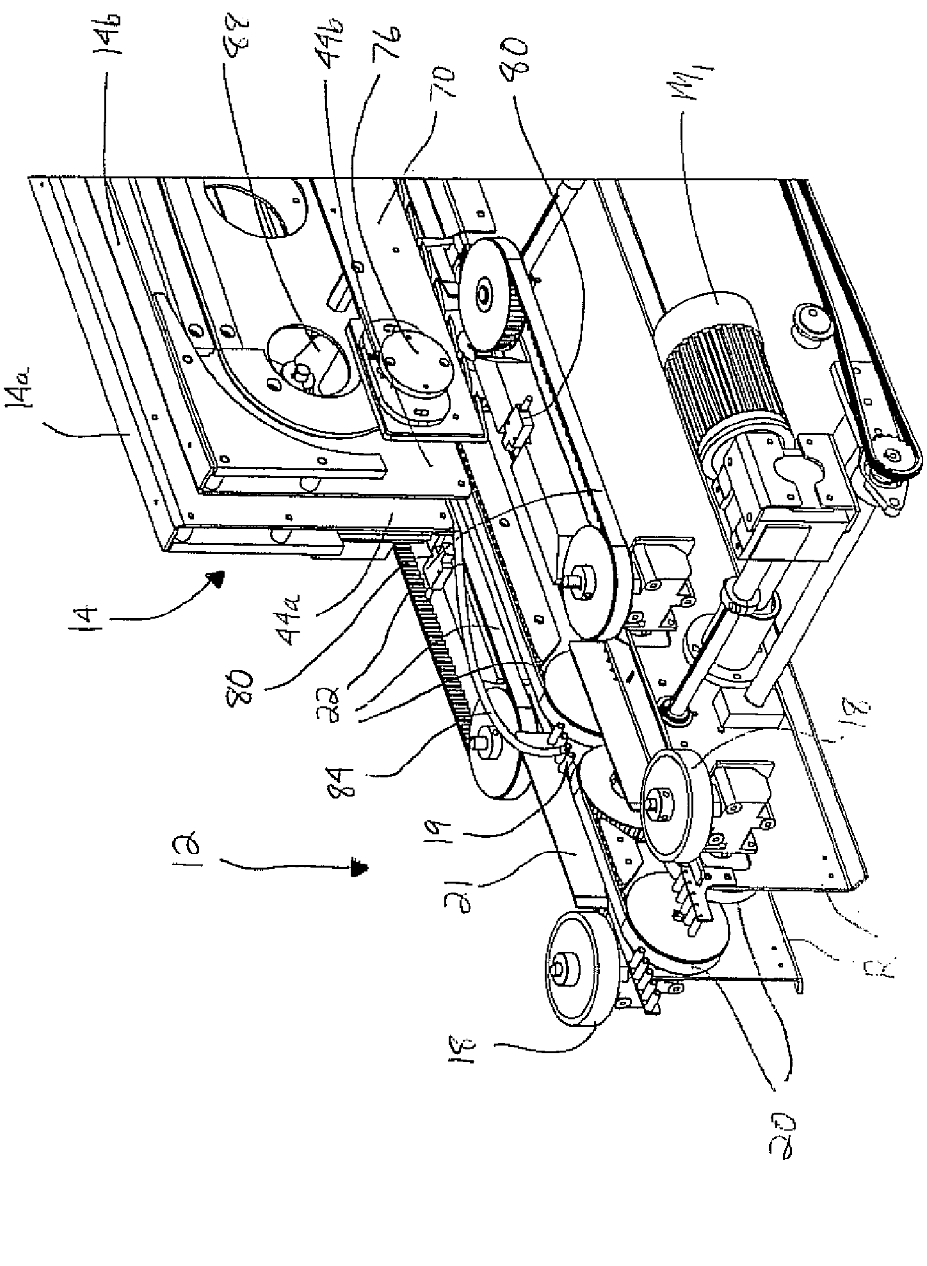
FIGS. 2a and 2b are partially cutaway front and rear perspective views of the infeed conveyor forming part of the machine of FIGS. 1a and 1b.
Figure 2B:
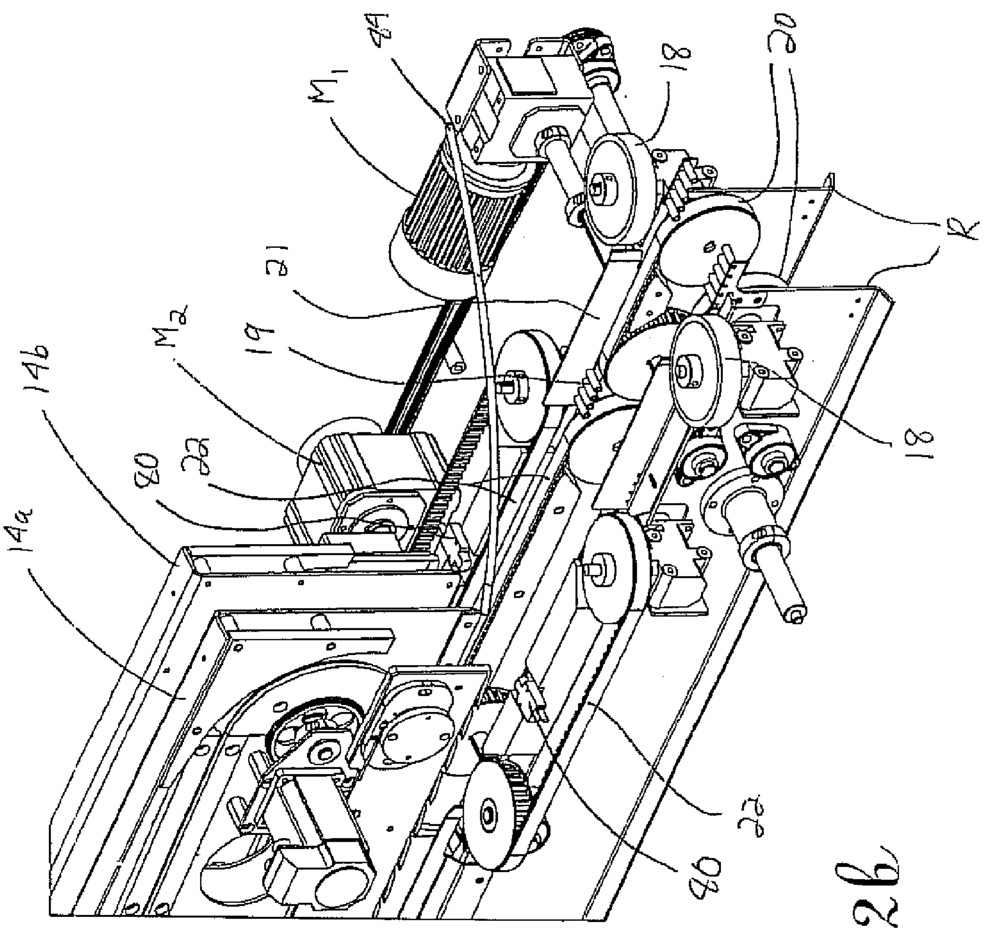

As perhaps best shown in FIGS. 2*a* and 2*b*, the infeed conveyor 12 in the illustrated embodiment includes metering devices in the form of a pair of spaced "hold back" wheels 18. These wheels 18 are supported by first and second spaced frame members R of the machine 10, and serve to initially receive and engage the corresponding sides of the carton while a pair of adjacent endless belt conveyors 20 frictionally engage the carton and urge it forward. This combination of wheels 18 and belt conveyors 20 ultimately deliver the individual cartons in a serial fashion at spaced intervals over idler rollers 19 and through spaced parallel guides 21 to corresponding pairs of spaced, generally parallel infeed belt conveyors 22 for frictionally engaging the sides and bottom of the carton to deliver it to the intermediate conveyor 14.

In one anticipated arrangement, the feed of partially formed and filled cartons to the machine 10 is random, and the belt conveyors 20, 22 are adapted to accelerate the randomly received cartons such that each travels at a known, substantially constant speed upon encountering the intermediate conveyor 14. As should be appreciated, this acceleration also helps to create the desirable gap with the next-in-line carton. The first set of belt conveyors 20 may be driven by a first motor $M_1$ (which may be a servomotor or variable frequency drive, and may also drive the metering wheels 18 at the same speed) and the second set of belt conveyors 22 may be independently driven by a second motor $M_2$. The use of independent first and second motors $M_1$, $M_2$ of course allows for driving the sets of belt conveyors 20, 22 at different speeds, as desired for a particular throughput or mode of operation. As outlined further in the description that follows, the speed control of the various motors and other aspects of the machine may be effected by an onboard computer or like logic device serving as a controller (see FIG. 13).

Figure 3A:
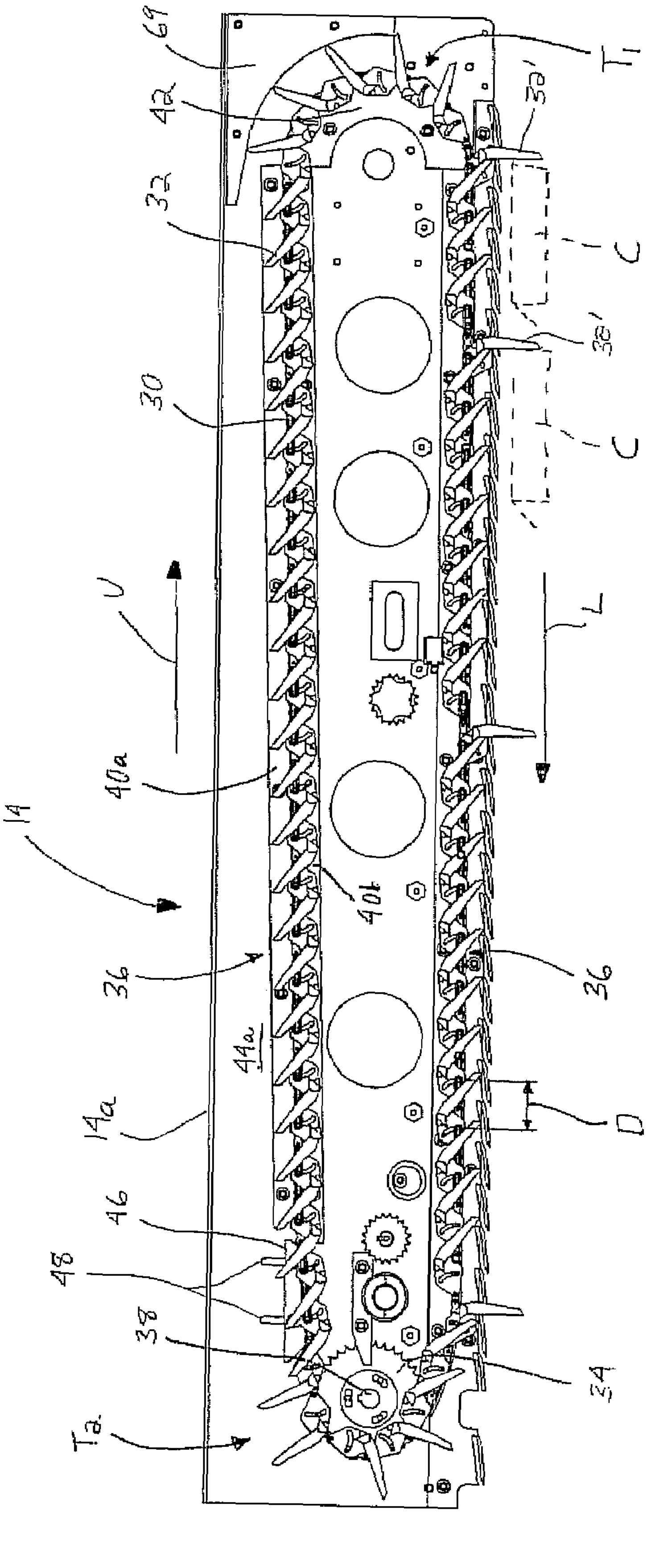
FIG. 3a is a side elevational view of an individual lug conveyor forming part of an intermediate conveyor in the machine of FIGS. 1a and 1b.
Figure 3B:
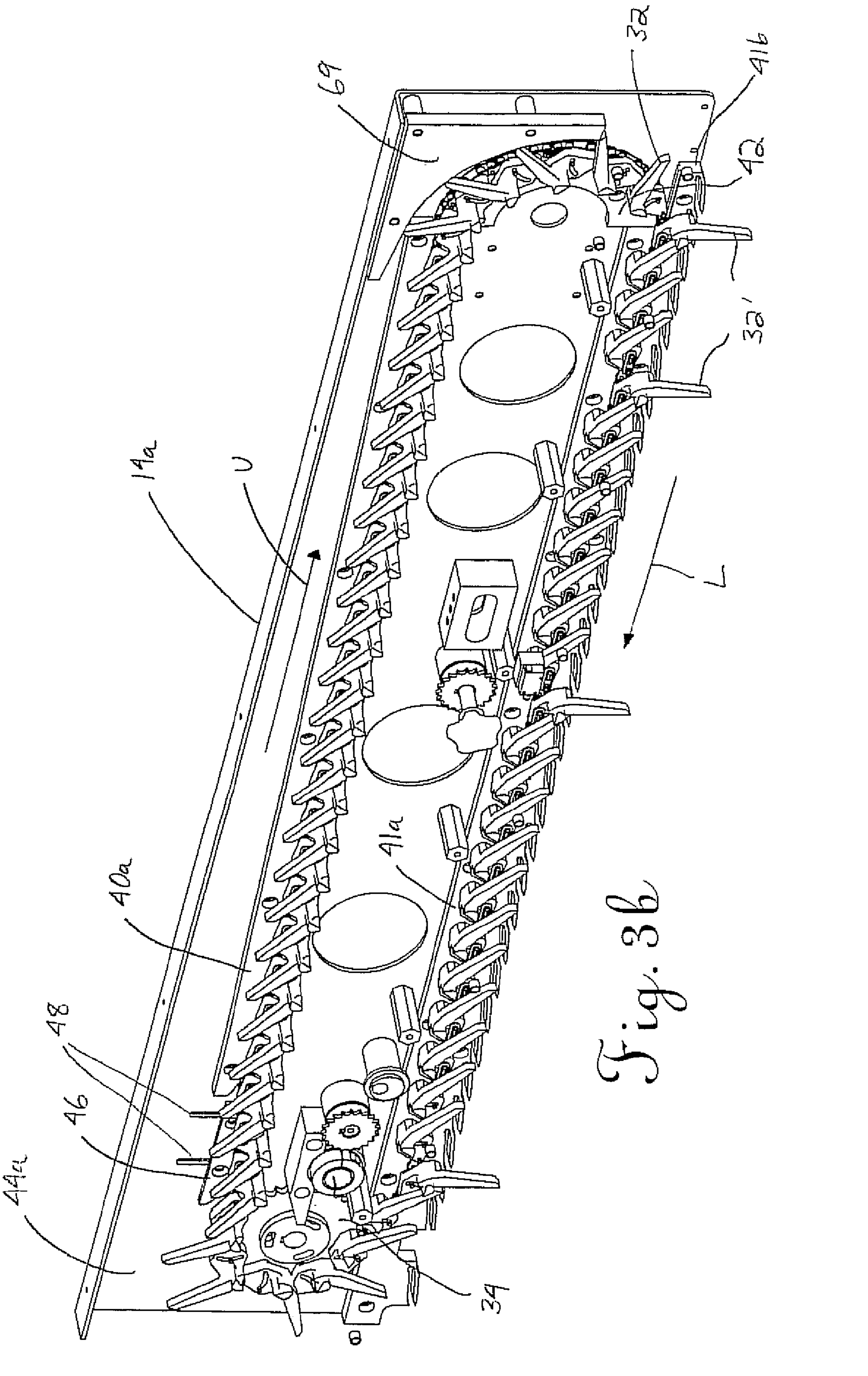

With reference to FIGS. 2*b* and 3*a*-3*b*, the construction of the intermediate conveyor 14 for receiving the cartons from the infeed conveyor 12 and conveying them along a horizontal path in a first direction is now described in detail. In the illustrated embodiment, the intermediate conveyor 14 is comprised of a pair of spaced, generally parallel lug conveyors 14*a*, 14*b* (front and rear when the machine 10 is in the orientation shown in FIG. 1*a*) that overlie and form a conveying path. As perhaps best shown in FIG. 3*a*, each lug conveyor 14*a*, 14*b* includes a chain 30 driven in an endless path along a forward or lower run (action arrow L) and a return or upper run (action arrow U), with first and second transitions $T_1$, $T_2$ between the runs. Each chain 30 carries a plurality of extensible lugs 32 that, as described in more detail below, may be selectively actuated from a retracted or normal position to a depending (or "pop-down") actuated position at a desired instant in time for engaging and conveying the partially folded and formed cartons received from the infeed conveyor 12.

Figure 4A:
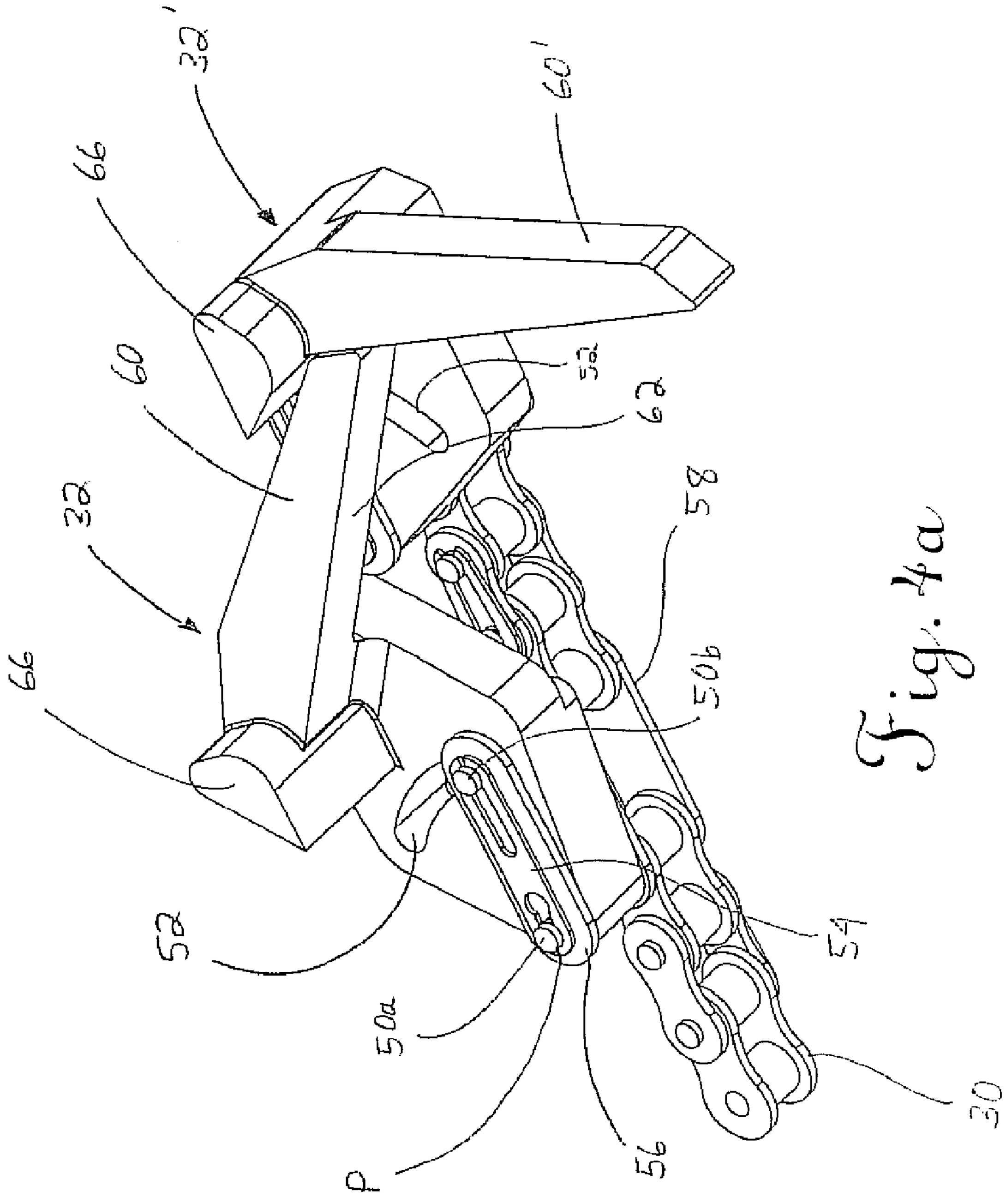
FIG. 4a is a bottom perspective view of a chain with closely spaced pivoting lugs for possible use in the lug conveyor of FIGS. 3a and 3b.
Figure 9:
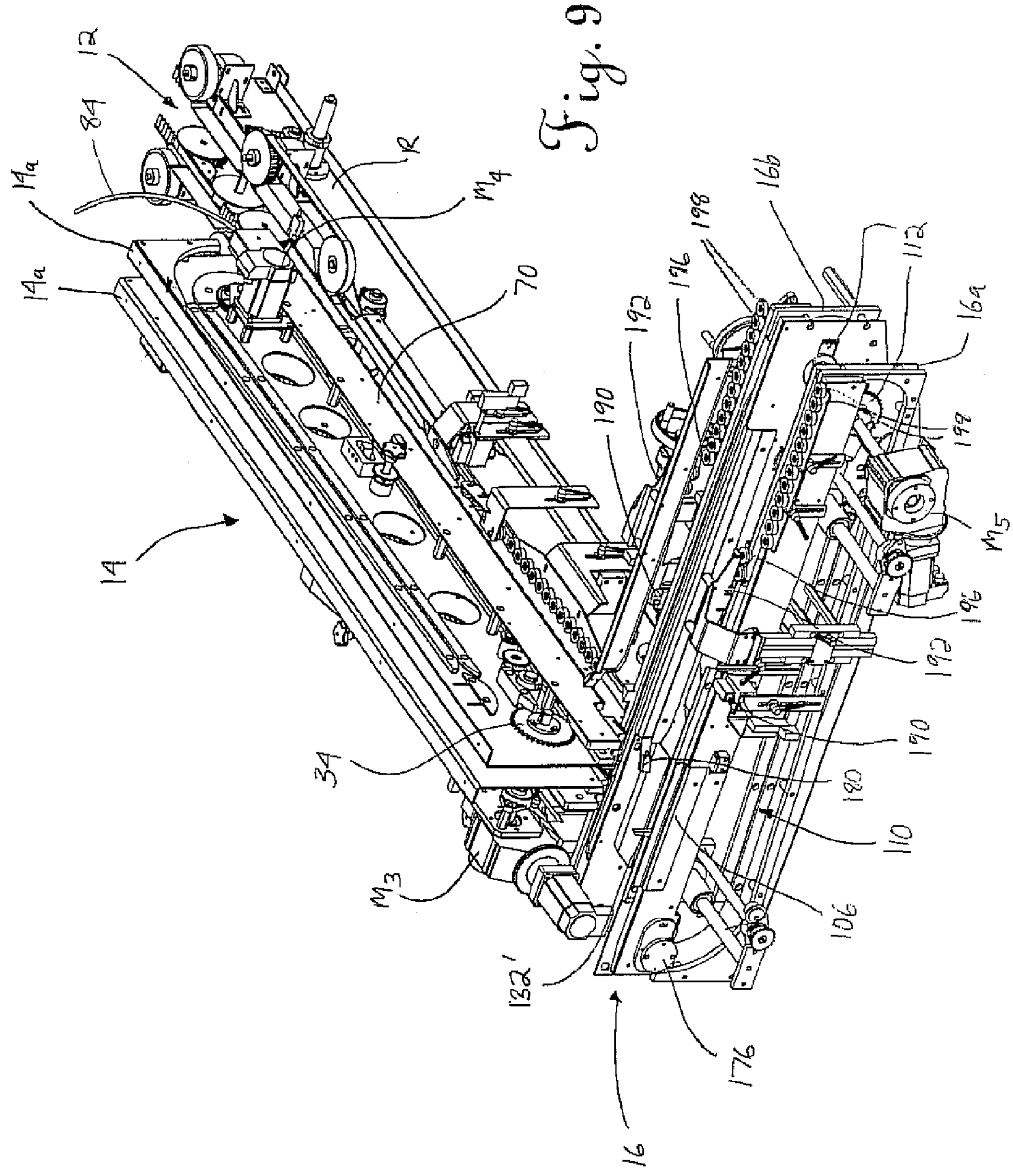
FIG. 9 is a perspective view of a takeaway conveyor associated with the discharge end of the intermediate conveyor.
Figure 10:
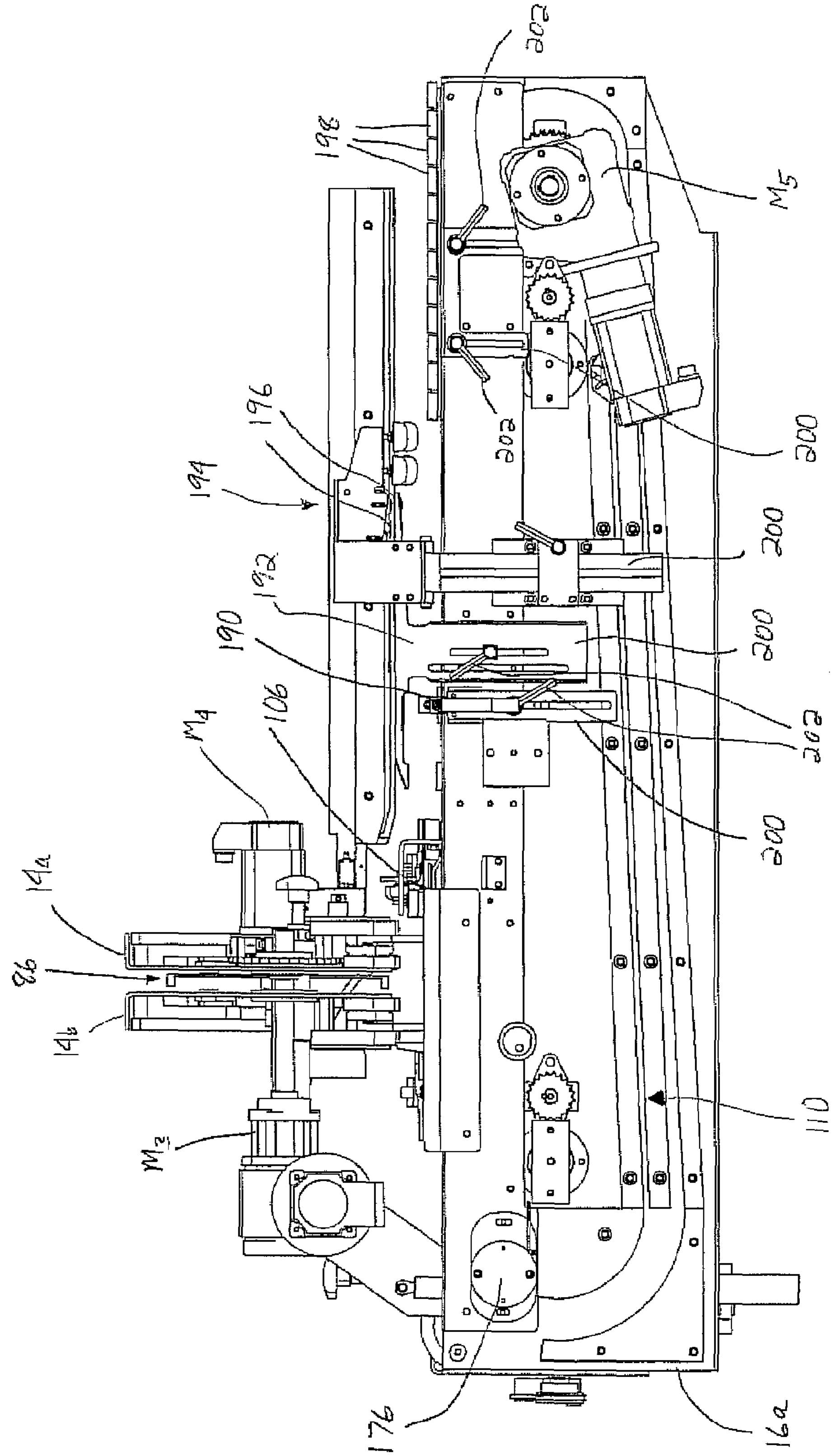
FIG. 10 is a side elevational view of the takeaway conveyor that also provides an end view of the intermediate conveyor.

More specifically describing the lug conveyors 14*a*, 14*b*, each includes a drive sprocket 34 for engaging and driving the corresponding chain 30 along an endless path formed by a guide track 36. Preferably, the sprocket 34 of each lug conveyor 14*a*, 14*b* is mounted on a common shaft 38 and gang-driven by a common motive device or third motor $M_3$ (see FIGS. 9 and 10). Consequently, each chain 30 is moved along the endless path at substantially the same speed. The chains 30 may be conventional link chains (see FIG. 4*a*), which may optionally include friction-reducing rollers.

As perhaps best shown in FIGS. 1*a* and 1*b*, the guide track 36 along the return or upper run U comprises a pair of elongated, spaced chain guides 40*a*, 40*b* creating a channel adapted for receiving the chain 30. To transition the chain 30 from the return, upper run U to the forward, lower run L, an end guide 42 with an outwardly directed rounded or semicircular engagement face is positioned for guiding the chain 30 along the corresponding transition $T_1$. Similar elongated spaced chain guides 41*a*, 41*b* (see FIG. 3*b*) form a channel for receiving and guiding the chain 30 along the forward or lower run L, which also comprise part of the guide track 36. The chain guides 40*a*, 40*b*; 41*a*, 41*b*; 42 may be supported by a frame member 44*a*, 44*b* associated with each conveyor 14*a*, 14*b* (see FIG. 5*b*).

To ensure that the chains 30 are maintained in a substantially taut condition, an adjustable tensioner may also be associated with each lug conveyor 14*a*, 14*b*. In the embodiment illustrated in FIGS. 3*a* and 3*b*, the tensioner is shown on lug conveyor 14*a* in the form of a cam 46 having a rounded or semi-circular face. This face engages a surface of the chain 30 as it moves from engagement with the sprocket 34 toward the upper chain guides 40*a*, 40*b* forming part of the guide track 36. Fasteners (not shown) passing through vertically-oriented slots 48 formed in the frame members 44*a*, 44*b* allow for the relative position of the cam 46 to be easily adjusted to vary the tension on the corresponding chain 30.

With reference now to FIGS. 4*a*-4*e*, the manner in which selected lugs 32 associated with the chains 30 of the conveyors 14*a*, 14*b* are simultaneously pivoted or moved to the actuated or depending position for engaging and conveying an object, such as a carton, is now described in detail. Turning first to the bottom perspective view of FIG. 4*a*, each lug 32 is mounted to and carried by the chain 30 such that it is capable of pivoting movement. For example, a pair of pins 50*a*, 50*b* may extend transversely from the chain 30 at selected intervals. A first one of the pins 50*a* passes through a hole (not shown) formed at one end of the lug 32 and the second pin 50*b* passes through a generally arcuate slot 52 formed in the body of the lug 32. A removable locking retainer 54 holds a plate-like bearing 56 against the outer surface of the lug 32, and a corresponding elongated connector 58 is provided for interconnecting the links (not numbered) along the opposite side of the chain 30.

As a result of this arrangement of structures, each lug 32 may freely pivot or rotate about the pivot point P (clockwise in the view of FIG. 4*c;* note action arrow Q) formed by the first pin 50*a* and travel along an arcuate path formed by the slot 52. Thus, a point on the surface of the lug 32 during pivoting is considered to follow an arcuate path. Preferably, when the lug 32 is in the retracted or "laid-back" position, as is the leading lug in FIG. 4*a*, the pin 50*a* is moved to the lower end of the slot 52. In this position, a projecting pusher 60 of the lug 32 remains withdrawn from the adjacent path of conveyance (see FIGS. 3*a* and 3*b*) such that it forms an acute angle with tie horizontal plane. In contrast, when the lug 32 is in the actuated or depending position, like the trailing lug 32' in FIG. 4*a*, the second pin 50*b* is moved to the opposite or upper end of the slot 52. Consequently, the pusher 60 extends into the conveying path for engaging the carton, and is generally perpendicular to the horizontal plane.

Figure 6A:
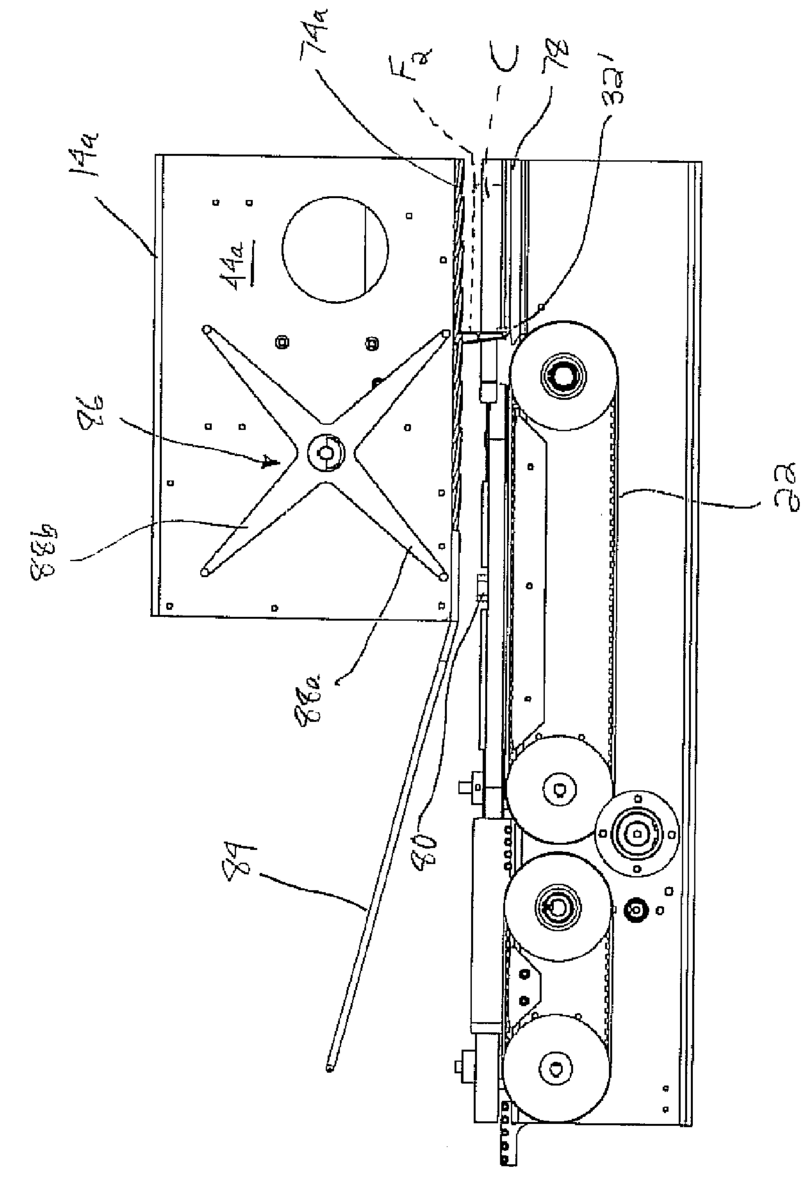
FIG. 6*a* is a partially cutaway side view of the machine taken from the rear, illustrating in particular the infeed end and the location of the pre-folding wheel relative to the front overhead lug conveyor.
Figure 6B:
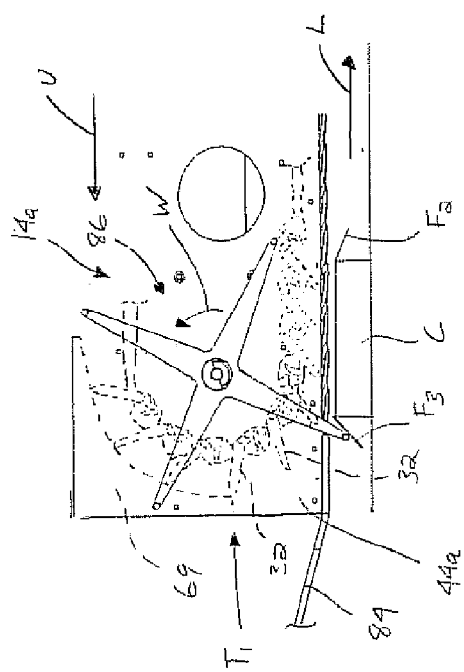
FIGS. 6*b*-6*e* illustrate the progressive and combined operation of the pre-folding wheel and lug conveyor for folding a trailing end flap on a carton while it is conveyed through the machine.
Figure 6C:
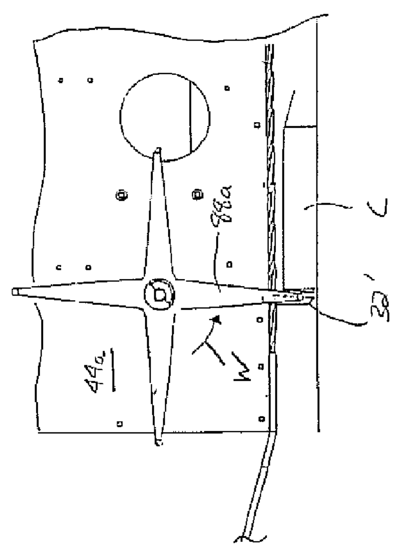
Figure 6D:
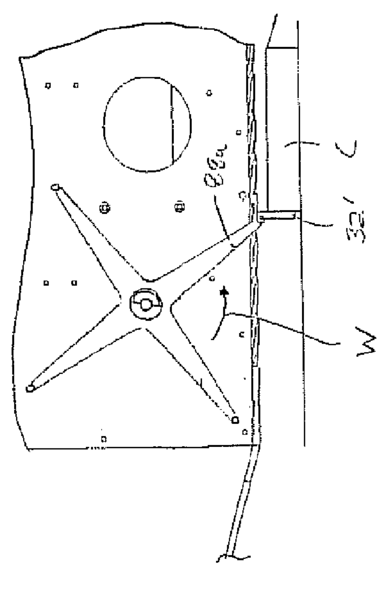
Figure 6E:
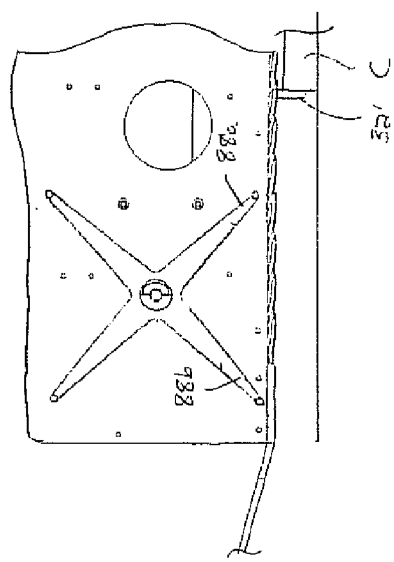

In the illustrated embodiment, the lugs 32 are oriented such that, when the pusher 60 of each is in the actuated position, the generally planar engagement face 62 is presented for engaging and pushing the carton along a trailing end (which with the trailing end flap $F_3$ in the folded condition is generally planar; see FIGS. 6*d* and 6*e*). However, as noted further in the description that follows, the lugs 32 could also be oriented such that the engagement face 62 of the pusher 60 contacts the carton along the leading end (and may thus be used to provide a squaring function as the carton is pushed along by either a belt conveyor or a bottom-running lug conveyor, or to hold the carton back while a pop-down lug is used to engage and fold an associated flap). A combination of the two approaches could also be used, either on the same conveyor in the case of lugs spaced far apart or different conveyors in the case of overlapping lugs. In either case, the engagement face 62 is preferably perpendicular to the horizontal plane when the lug 32 is actuated.

With reference again to FIG. 4*a*, each lug 32 includes a transversely extending projection or tab 66. Preferably, each tab 66 is specially contoured to include a first sloping or inclined leading face 66*a* for engaging a first surface of a diverter, such as a pivotally mounted finger 68. In the illustrated embodiment, the finger 68 is tapered and elongated in the conveying direction. The finger 68 may project from an elongated support structure 70 positioned adjacent to the conveyor 14*a* and, more particularly, along the lower run L thereof.

Figure 4B:
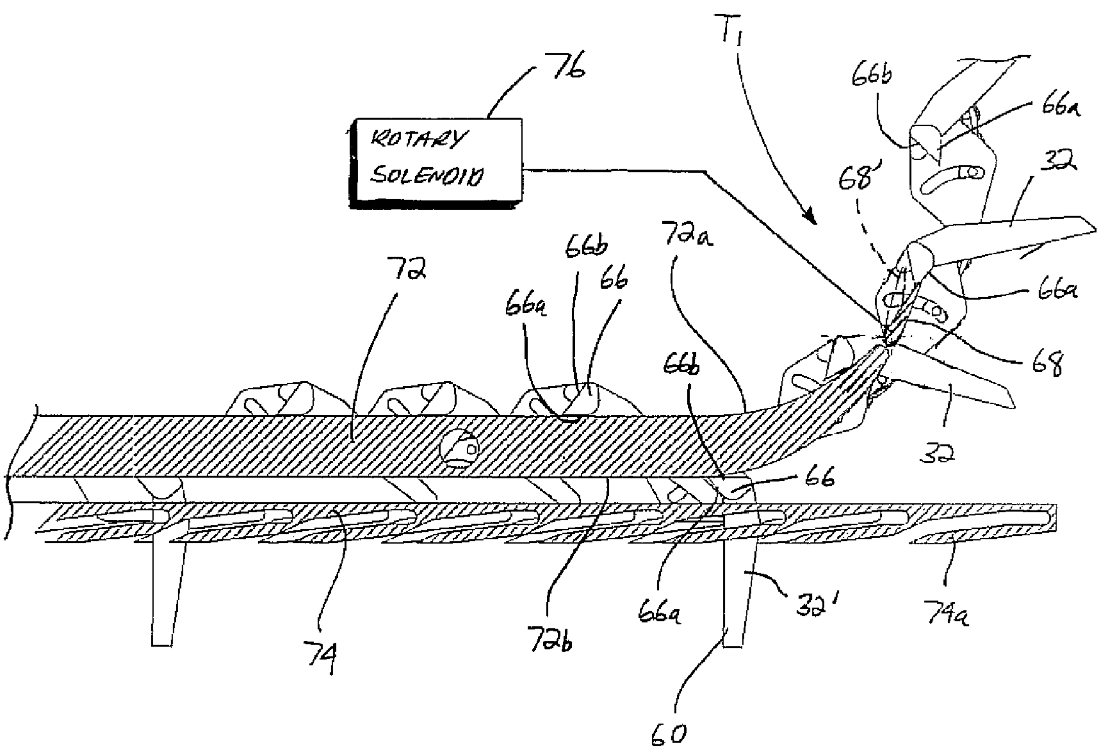
FIG. 4b is a partially cross-sectional, partially cutaway view illustrating the manner in which a selected lug may be actuated in the lug conveyor of FIGS. 3a and 3b.
Figure 4C:
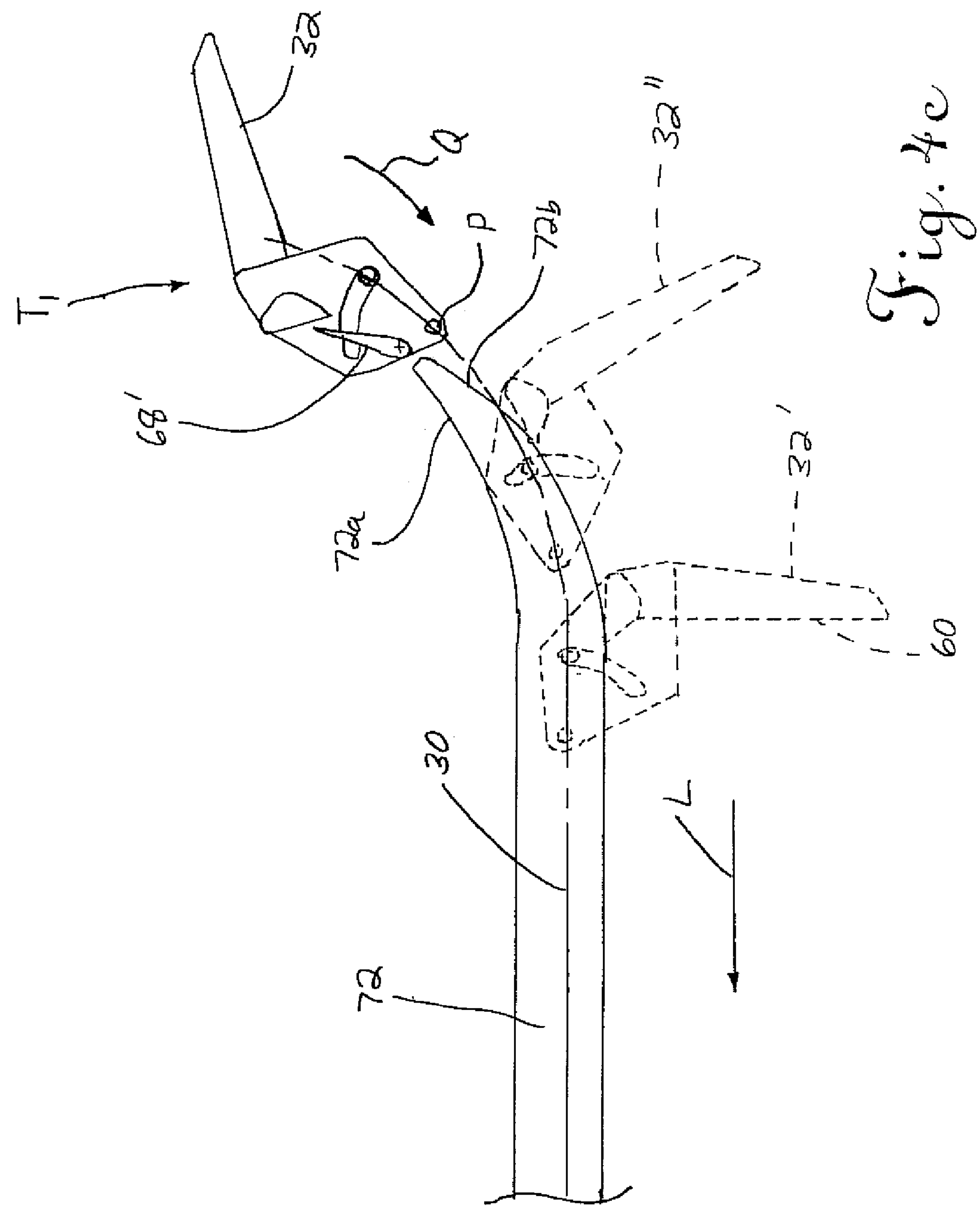
FIG. 4c is a partially cutaway, schematic side view showing the progressive actuation of a single lug selected for actuation.
Figure 4D:
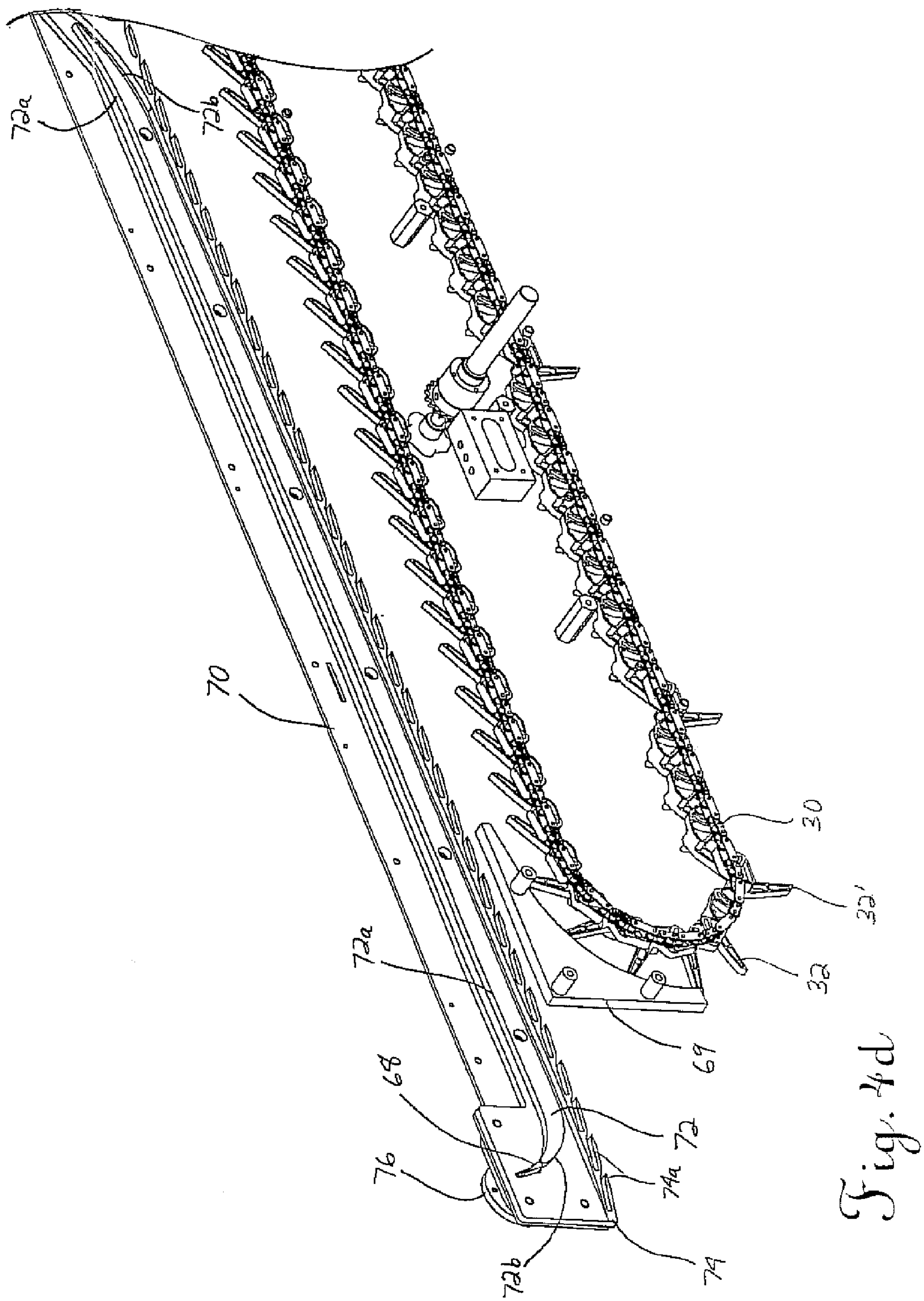
FIG. 4d is a partially exploded, partially cutaway perspective view of the lug conveyor of FIGS. 3a and 3b.
Figure 4E:
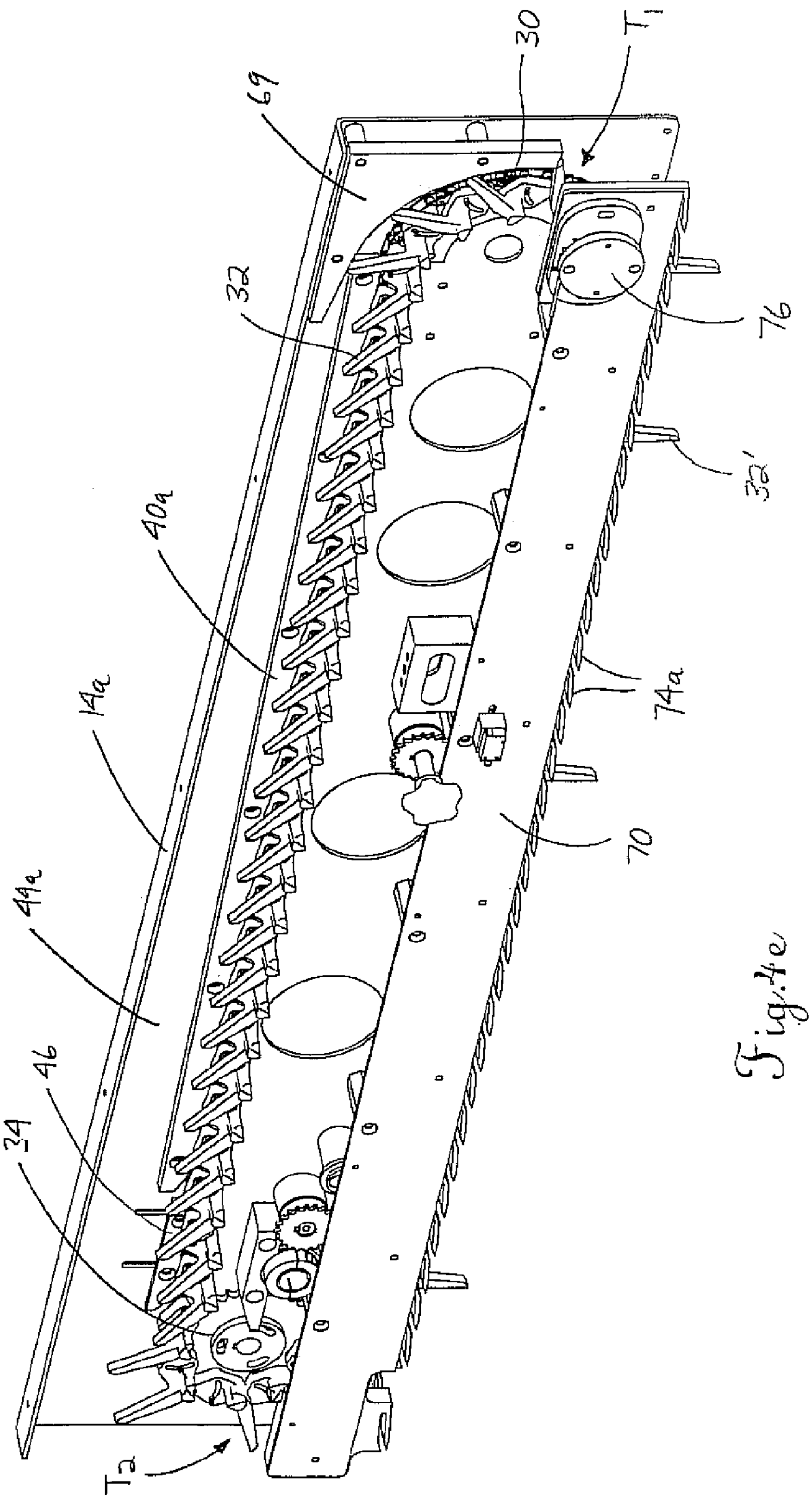
FIG. 4e is a perspective view of the lug conveyor of FIG. 4d in an assembled state.

When in the home position as shown in FIG. 4*b*, a first side of the finger 68 may engage the leading face 66*a* of the tab 66 extending from each lug 32. This guides it into engagement with a first surface 72*a* of a guide structure 72 supported by the support member 70 and also forming part of the diverter. As a result, the corresponding lug 32 is maintained in the retracted position as it travels along with the chain 30. In this position, the elongated pusher 60 is incapable of engaging a carton in the conveying path by virtue of the captured nature of the corresponding transverse tab 66.

An optional guide structure 74 maybe associated with each lug conveyor 14*a*, 14*b*. In the illustrated embodiment, the guide structure 74 comprises a plurality of flexible fingers 74*a* extending from the support member 70. The fingers 74 preferably extend in the conveying direction and are flexible in order to accommodate overfilled cartons.

When actuation of a particular lug 32 is desired, such as for engaging a portion of a stationary or fleeting carton adjacent to the conveyor(s) 14*a*, 14*b*, the finger 68 is pivoted (counterclockwise in FIGS. 4*b* and 4*c* to position 68') to engage an different surface 66*b* of the corresponding tab 66. The pivoting movement may be provided by a corresponding motive device, such as a rotary solenoid 76 (see FIG. 4*d*, and note that a servo or stepper motor or like device could also be used). In any case, the actuation of the particular motive device chosen is controlled by the controller (see FIG. 13). Preferably, the pivoting is momentary and through a small angular range (e.g., a few degrees in the counterclockwise direction). As a result, only the transverse tab 66 of a single selected lug 32 is engaged but the projection of the next-in-line lug is not (even when the chains 30 are moving at high speeds; e.g., greater than 1 ft/s).

Initially, the engagement with the finger 68 in the actuated position causes the selected lug 32 to begin the pivoting sequence, such as by moving from a retracted position to approximately 10° pivoted (that is, the second pin 50*b* travels approximately 10° along the arc defined by the slot 52). The finger 68 when actuated guides the tab 66*a* into engagement with a second, adjacent engagement surface 72*b* at the upstream end of the guide structure 72, which is also considered to be located in or along the transition $T_1$ from the return run to the forward run. The portion of the engagement surface 72*b* at the upstream end of the guide structure 72 by the transition $T_1$ is curved or specially contoured such that the partially pivoted lug 32 moves to a more fully pivoted position (note phantom position 32" in FIG. 4*c*) and ultimately to a fully pivoted position (position 32' in FIGS. 4*b* and 4*c*), with the elongated pusher 60 now fully depending and ready to engage a portion of a carton or other object on an adjacent support surface (such as a dead plate, a conveyor, a pair of spaced guide rails, etc.). With the partial pivoting created by the engagement with the finger 68, the total range of movement of the lug 32 in the preferred embodiment is about 60° (which means that the slot 52 forms an arc of about the same angle). This actuation sequence performed along the transition $T_1$ helps to reduce the amount of gap required between successive cartons. The engagement with the continuous guide surface 72*b* also ensures that the actuated lug 32' remains in position and prevents inadvertent retraction.

An optional guide structure 69 with a curved engagement face may also extend at least partially along the transition $T_1$ from the return or upper run U to the forward or lower run L (see FIG. 6). The engagement between the tip of the pusher 60 and the curved face of this guide structure 69 helps to resist the centrifugal and gravitational forces that tend to rotate each lug 32 toward the infeed end as it moves through the transition $T_1$. This in turn helps to ensure that the transverse tab 66 remains in the desired position for engaging the corresponding surface of the finger 68 such that it reaches the desired surface 72*a*, 72*b* of the guide structure 72.

As noted above, conventional lug conveyors typically include lugs spaced apart at relatively large, pre-selected intervals corresponding to the length of the carton in the conveying direction. The chain carrying the lugs is then driven at a speed corresponding to the rate at which the cartons are introduced (commonly referred to as a "timed" chain). To ensure smooth, uninterrupted operation, this timed chain arrangement requires that the cartons are fed in a timed sequence corresponding with the position of lugs. If the carton is early or the lug is behind, a delay may result while a catch up occurs. Alternatively, if the carton is not yet in a ready position for conveyance at the proper instant in time, the lug during actuation may inadvertently crash into the lid or underside of carton, resulting in permanent and severe damage (which can in turn lead to a jam in the machine and deleterious downtime to take the necessary corrective action).

With reference back to FIGS. 3*a*, 4*a*, and 4*b*, the lug conveyors 14*a*, 14*b* used in the preferred embodiment of the machine 10 avoid this problem by closely spacing the of lugs 32 along the chain 30. In the most preferred embodiment, the distance D from a point on any leading lug, such as the center, to the corresponding point on the next-adjacent trailing lug in the retracted or normal position (commonly referred to as the "pitch") is preferably about 2.5 inches, and most preferably exactly 2.5 inches. In this embodiment, this distance D is less than the width of each lug in the conveying direction (such that about five lugs in the normal position are provided for each foot of chain 30 and, more precisely, 4.8 lugs in the most preferred embodiment (12" per foot/2.5" pitch). Consequently the leading and trailing lugs 32 fully overlap with one another, even in the retracted normal condition. Preferably, the overlap occurs in the conveying direction (parallel to action arrow L in FIG. 3*a*) or a direction generally transverse to the conveying direction and the vertical direction (e.g., perpendicular to action arrow L and in the same horizontal plane), depending on the orientation of the lugs 32. In other words, a trailing part of each leading lug (such as the pusher 60) at least partially covers a leading part of each trailing lug, both along the upper and lower runs U, L.

This close spacing provides the lug conveyors 14*a*, 14*b* with the ability to vary the pitch of the actuated lugs. Consequently, when the chains 30 are moving at high rates of speed, the lugs 32 are essentially infinitely actuatable at a desired instant in time at any location along the endless path where the diverter (finger 68) is positioned. By positioning the diverter at the transition $T_1$ to the forward run, an adjacent carton may be engaged and conveyed at the point of introduction without the need for precisely timing the infeed to ensure that a smooth, uninterrupted operation is maintained. Even in the situation where the cartons are randomly fed, the ability to selectively actuate the lugs (and thus vary the pitch of the actuated lugs on the chain 30) reduces the time between the carton reaching the position for conveyance and the actual engagement event. A significant increase in throughput is therefore possible with enhanced reliability. Advantageously, the use of pusher lugs 32 also avoids the possible skewing created when the carton is conveyed via frictional engagement with top and bottom-running belts.

Figure 5A:
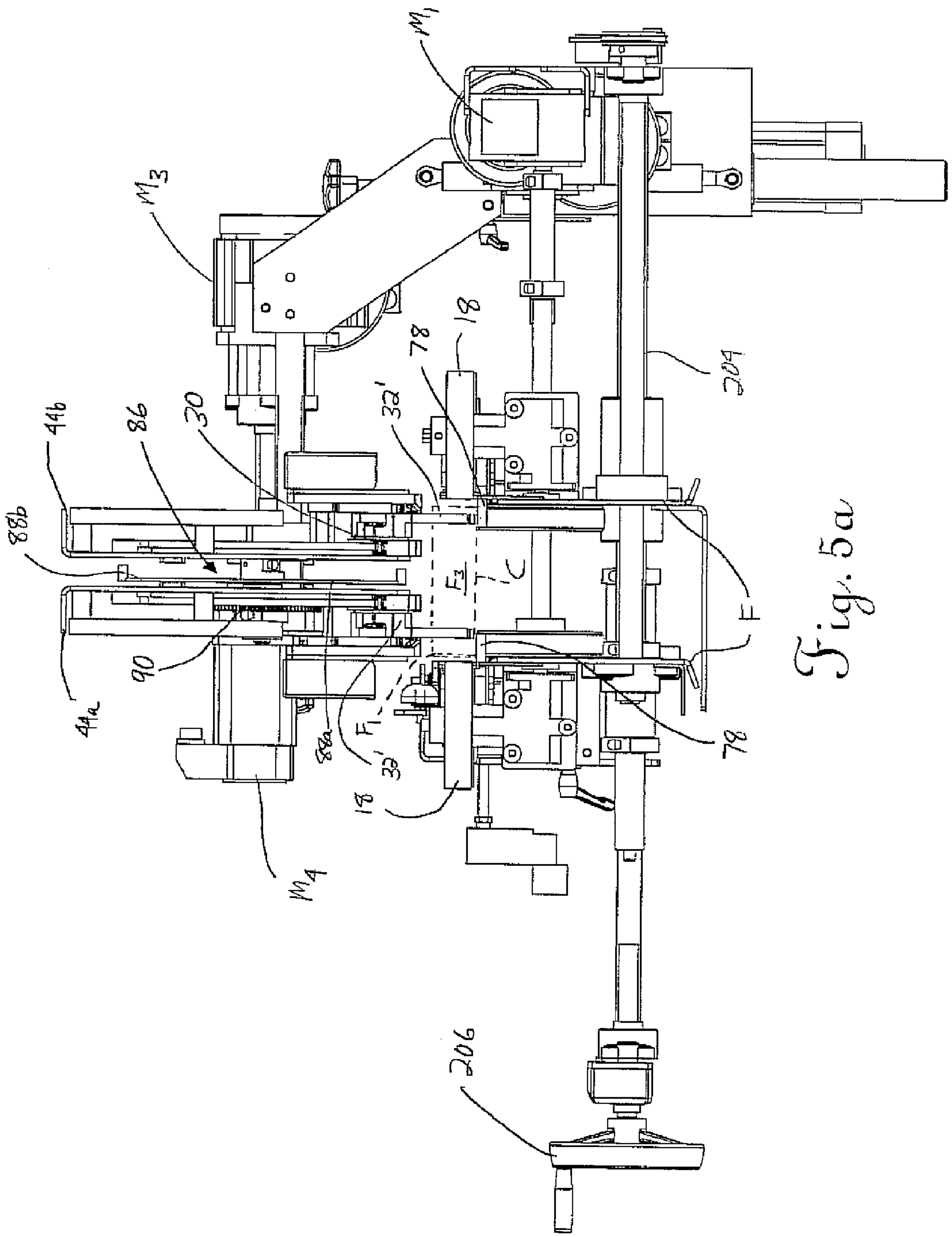
FIG. 5a is a partial end elevational view of the machine of FIGS. 1a and 1b, taken from the infeed end.

With reference now to FIG. 5*a*, one possible mode of operation of the machine 10 is to deliver the partially formed cartons to a stable support surface, such as a pair of spaced, elongated support rails 78, positioned adjacent to the intermediate conveyor 14 and along the conveying path. The carton may be introduced at a constant speed using the belts 22, and the leading end may be detected by adjacent position sensor 80 (which may comprise a photo-electric, through-beam type sensor with an opposed transmitter and receiver). Based on the known dimensions of the carton (which may be inputted by the operator to the controller via an interface such as a touch screen 82; see FIGS. 1*a* and 1*b*), the known position of the leading end (as determined by sensor, which may generate a corresponding output signal), and the known speed of travel of the carton (as determined by the infeed belts 22, and may be adjusted by the operator depending on the desired throughput), the finger 68 may be actuated at the desired instant in time such that a single lug 32 of each conveyor 14*a*, 14*b* moves to the actuated or depending position to engage and convey the carton. The selective actuation of the lugs by the finger 68 along the transition $T_1$ ensures that only a selected lug is engaged just in time for engaging the carton (which is spaced from the next-in-line carton by the metering wheels 18 and belts 20 22) in the desired fashion. The operation is thus smooth and efficient, which allows for an increase in throughput without a concomitant increase in downtime to clear deleterious jams.

Figure 1C:
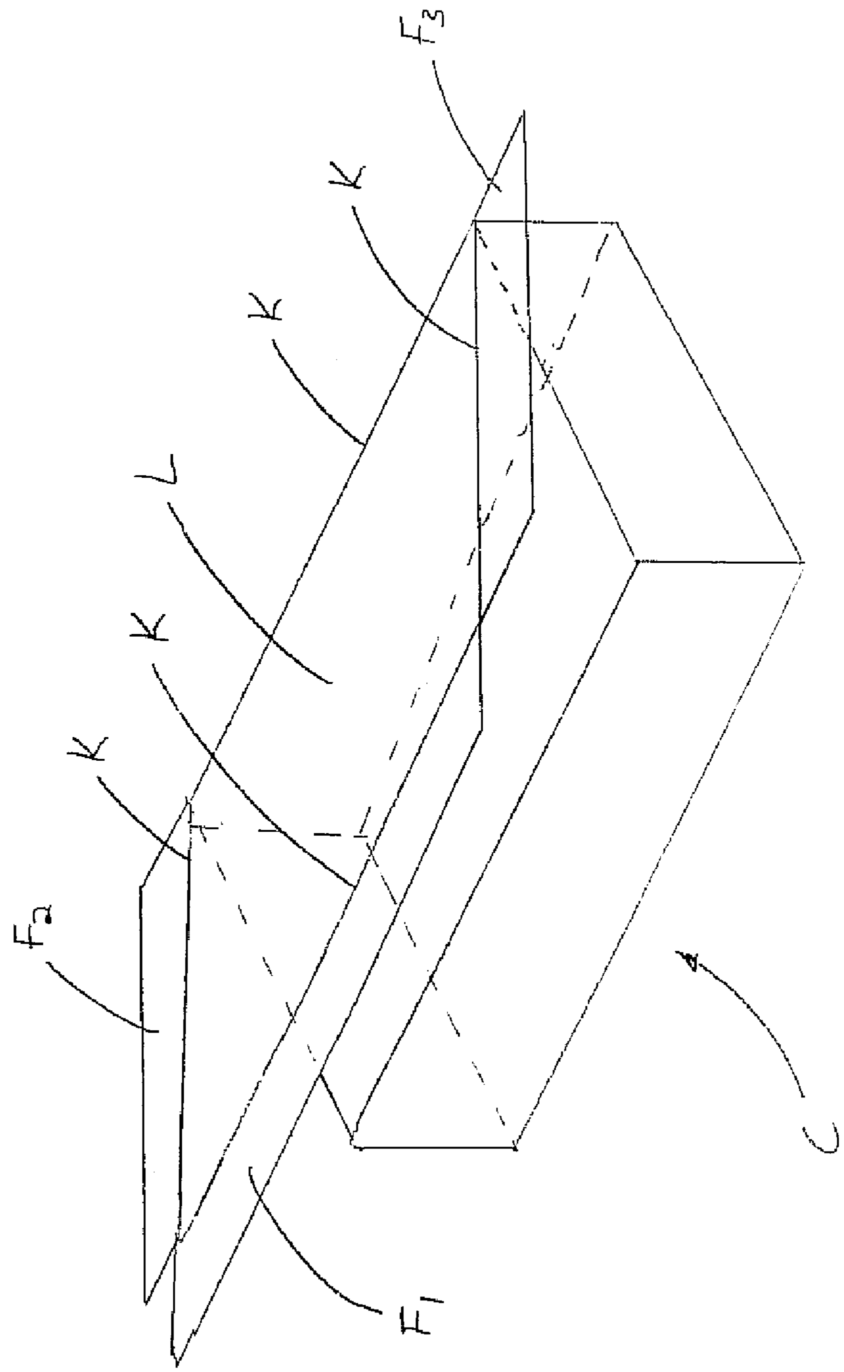
FIG. 1c is a perspective view of a top-loaded carton with a lid or closure having flaps along three sides thereof.

In the typical arrangement, the partially formed and filled carton C is introduced to the machine 10 with the lid L or closure in an open state and the flaps unfolded, as shown in FIG. 1*c*. Consequently, as the carton enters the machine 10, the lid L must be moved toward the closed position in order to allow for the folding and sealing of the associated flaps. In the preferred embodiment, the closing is accomplished by a static plow 84 for engaging the generally vertically oriented lid and automatically folding it as the carton approaches the intermediate conveyor 14. When the lid L is closed, a first side flap $F_2$ of the carton remains unfolded along the leading end and the second side flap $F_3$ remains unfolded along the trailing end. In this orientation, the front side flap $F_1$ faces the front of the machine 10 as it appears in FIGS. 1*a* and 1*b*. This is known as a "narrow end" leading configuration (that is, the narrower lateral side of the rectangular carton is the leading or front edge). However, it should be appreciated that the converse configuration may also be used in cartons where the side flaps are on the elongated sides of the carton (although an adjustment in the spacing of the lug conveyors 14*a*, 14*b* may be necessary).

Figure 5B:
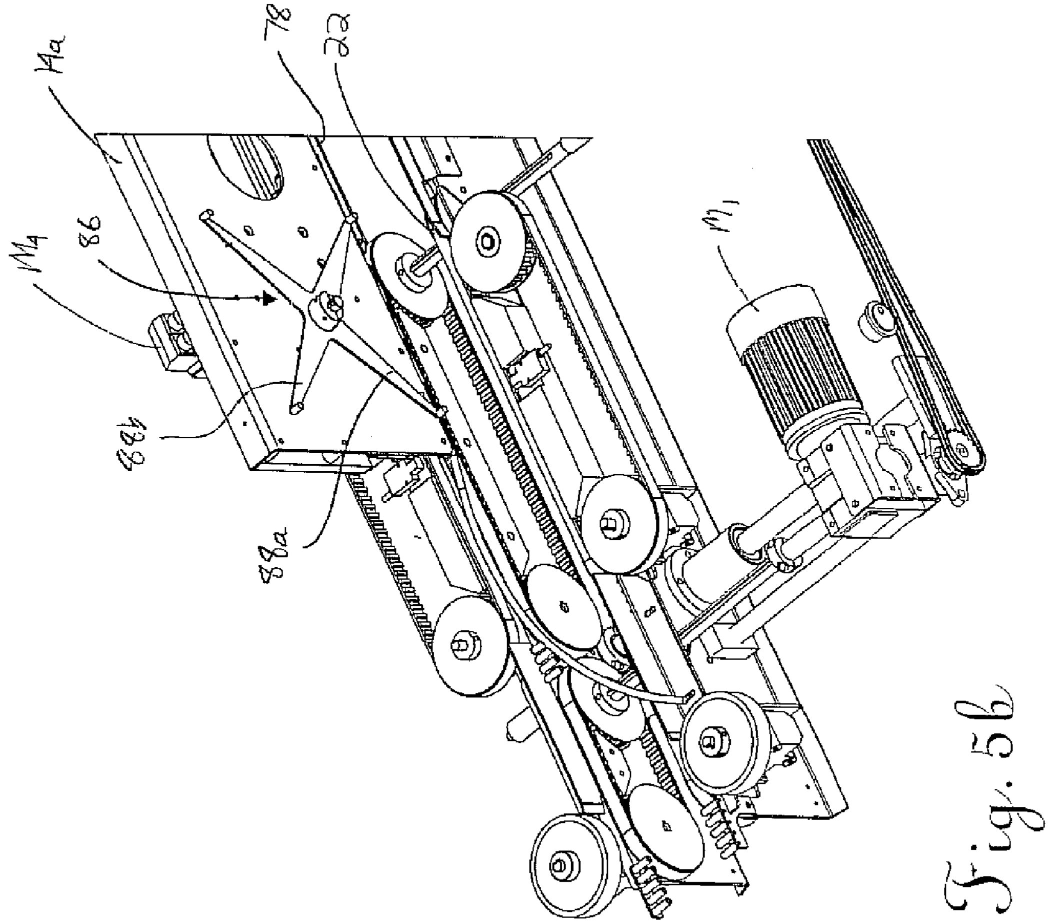
FIG. 5b is a partially cutaway, rear perspective view of the infeed end of the machine showing one example of a rotatable wheel for pre-folding a flap on the carton as it advances through the machine.
Figure 5C:
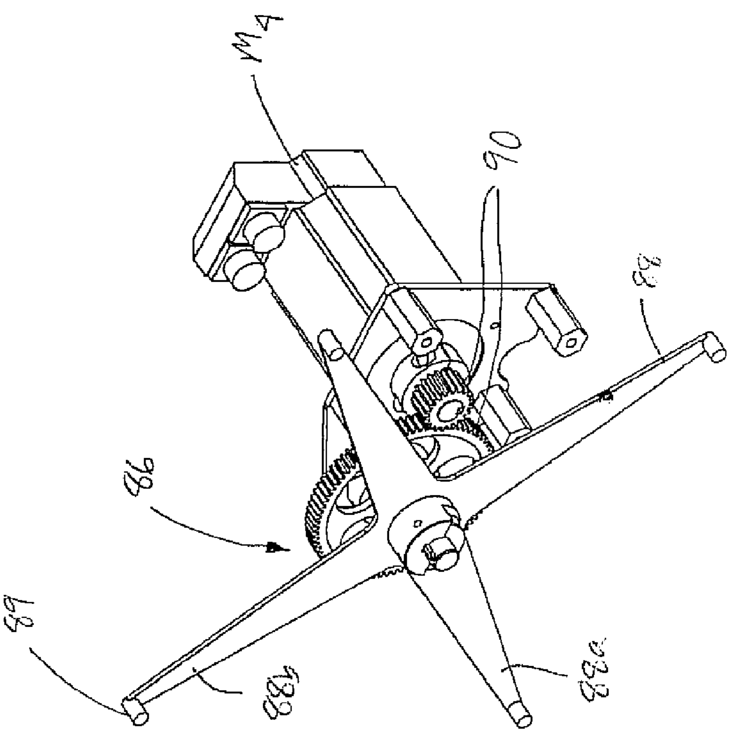
FIG. 5c is a perspective view of the pre-folding wheel apart from the machine and the mechanism for causing the wheel to rotate.

Engaging the carton with the trailing end flap $F_3$ in the unfolded or open condition using lugs 32 is undesirable in most instances, since damage may result. To avoid this situation, the trailing end flap $F_3$ of each carton introduced to the machine 10 maybe at least partially pre-folded before being engaged by the lugs 32. In the illustrated embodiment, the pre-folding or partial closing of this flap $F_3$ is accomplished using a rotatable wheel 86 including one or more radially extending projections. The projections thus form fingers or paddles 88 adapted for engaging the trailing end flap $F_3$ (FIGS. 5*a*-5*c*). The wheel 86 is preferably positioned between the lug conveyors 14*a*, 14*b* such that when it is rotated, a paddle 88 moves into engagement with the trailing end flap $F_3$ to at least partially fold and close it prior to engagement with the selected lugs 32 in the actuated position. In the illustrated embodiment, the wheel 86 includes four paddles 88 (each with an optional transversely extending foot 89), and is thus intermittently rotated one quarter turn to cause the corresponding paddle 88*a* to advance into engagement with the trailing end flap $F_3$. The rotation may be effected by an onboard motive device, such as a motor $M_4$. Suitable gearing 90 may also be used to ensure that a full or partial turn of the output shaft of the motor $M_4$ effects the desired amount of rotation in the wheel 86 for both folding the trailing end flap $T_3$ and retracting the corresponding paddle 88*a* from the conveying path.

Thus, in another, more preferred mode of operation, as shown in the progressive views of FIGS. 6*a*-6*d*, the carton C is introduced to the intermediate conveyor 14 traveling at a generally constant and predictable speed as the result of the infeed belts 22 (which as perhaps best shown in FIG. 6*a* may extend at least partially beneath the adjacent overhead conveyor 14). As the carton C is conveyed along by the belts 22, the position of the leading end adjacent to the side flap $F_2$ is detected using sensors 80, and the length in the conveying direction is known from the operator input. Consequently, the moment in time when the trailing end flap $F_3$ is adjacent to the corresponding paddle 88*a* may be determined by the controller (which receives the output signal from the sensor 80 used to actuate the wheel 86). Preceding or at that instant, the wheel 86 is rotated (note counterclockwise action arrow W) such that the next-in-line paddle 88*a* sweeps into the conveying path (FIG. 6*b*) to engage and at least partially fold the trailing end flap $F_3$ (FIG. 6*c*).

At about the same instant in time, corresponding lugs 32 associated with the lug conveyors 14*a*, 14*b* are also selected for actuation by momentarily pivoting the fingers 68 associated with the lug conveyors 14*a*, 14*b*. The lugs 32 selected for actuation thus move into the conveying path slightly behind the at least partially folded trailing end flap $F_3$ (FIG. 6*b*). Preferably, the timing is such that the lugs 32 catch up with the carton C to engage and convey it just as the trailing end flap $F_3$ is partially folded (at which point the conveying influence of the belts 22 is no longer necessary). The lugs 32 may then, and possibly for only a brief instant in time, simultaneously engage the at least partially folded flap $F_3$ with the paddle 88*a* and convey the carton along (and possibly complete the folding, depending on the timing). Eventually, the carton C advances to a point where the paddle 88*a* disengages from the trailing end flap $F_3$ (FIG. 6*d*).

Continued rotation of the pre-folding wheel 86 retracts or withdraws the paddle 88*a* from the conveying path to a position between the lug conveyors 14*a*, 14*b* (FIG. 6*e*). Simultaneously, the next-inline paddle 88*b* moves to a ready position for engaging the trailing end flap $F_3$ on a next-in-line carton. In this particularly preferred embodiment, the combined use of the pre-folding wheel 86 and the selectively actuated, small pitch (overlapping) lugs 32 with the corresponding diverter (finger 68) positioned at the transition $T_1$ advantageously provide for smooth, efficient, and reliable operation, even at high throughput speeds (e.g., 120 cartons per minute).

Figure 7:
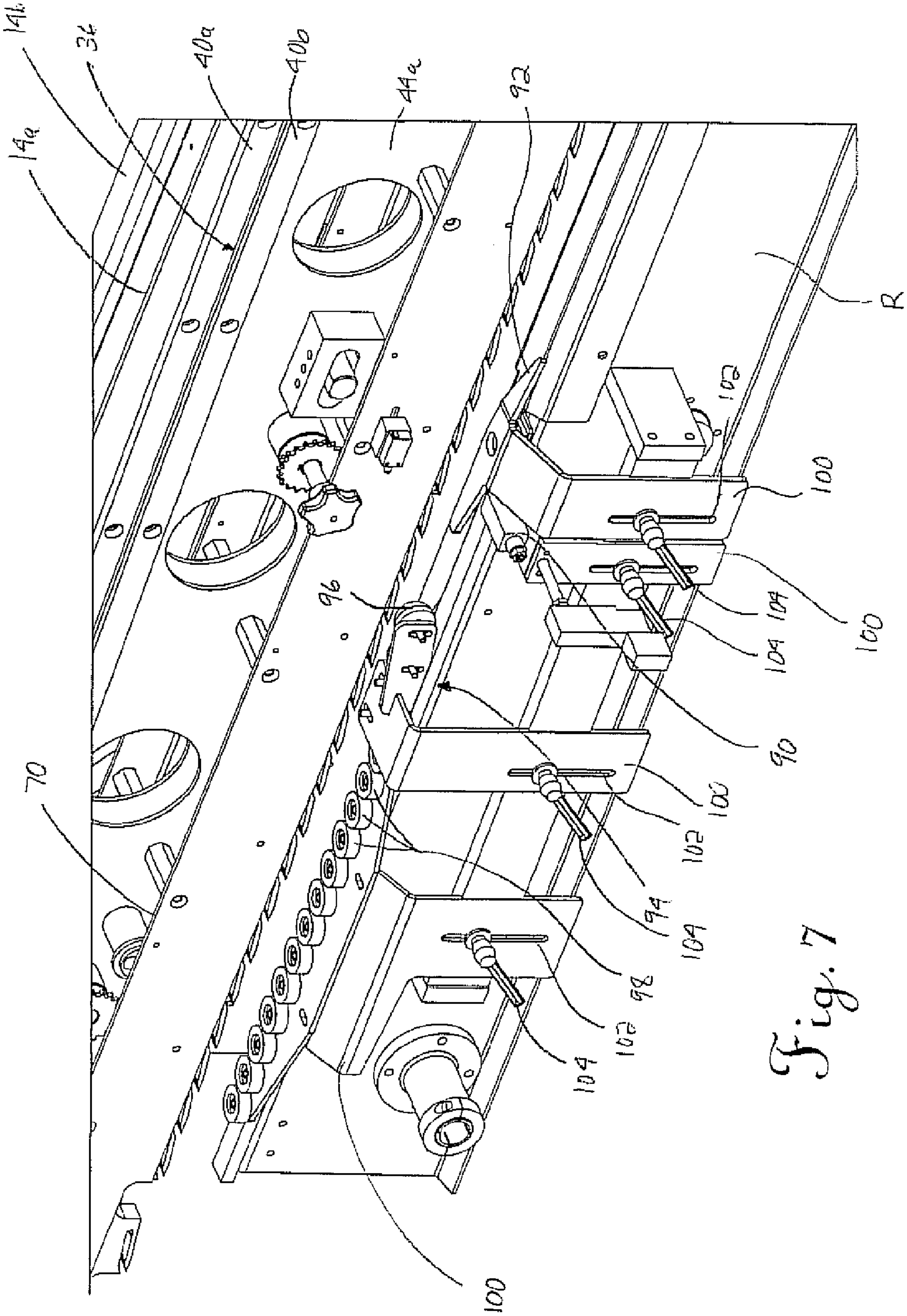
FIG. 7 is a partially cutaway perspective view of the structures or means for folding and sealing a flap positioned along the intermediate conveyor and adjacent to the conveying path defined thereby.

Turning now to FIG. 7, as the carton is conveyed along by the depending lugs 32, the front or "broad" side flap $F_1$ is folded and scaled. In the illustrated embodiment, an adhesive is applied to the sidewall of the carton using a gun 90 or like device positioned adjacent to the conveying path (which may be triggered based on the output of the corresponding sensor 80). A stationary plow 92 protruding into the conveying path may engage the underside of this broad side flap $F_1$ as the carton is conveyed. A downstream roller assembly 94 includes one or more strategically oriented roller wheels 96 (e.g., two mounted for rotation about a horizontal axis; two mounted for rotational about a vertical axis) for engaging and completing the folding of the flap $F_1$ with the assistance of the plow 92. Next, a series of downstream compression discs 98 receive the folded flap $F_1$ and apply gentle pressure as the carton is conveyed. This helps to ensure that the adhesive sets such that a proper seal is formed and the lid is correctly registered. It should further be appreciated that, during this folding sequence, the engagement between the pushers 60 of the actuated lugs 32' and the trailing end of the carton C (see FIG. 6*e*) helps to ensure that the lid L or closure is maintained in the proper position.

The adhesive gun 90, plow 92, roller assembly 94, and compression wheels 98 are preferably each adjustable to accommodate cartons having different heights. Specifically, the mount 100 for each structure may include a vertically oriented slot 102. A shaft (not shown) supported by the frame R of the machine 10 or an extension thereof passes through the slot 102. A manually operable, quick-release fastener 104 associated with the end of each shaft may fix the relative position of each mount, as desired to ensure that the broad side flap $F_1$ is folded and sealed as desired. Once the proper adjustment of these exemplary folding and sealing structures is made for a carton having a particular size and structure, re-adjustment should be unnecessary.

After the broad side flap $F_1$ is folded and sealed, the depending or "pop-down" lugs 32 continue to push the carton along the guide rails 78 and eventually eject it from a discharge end of the intermediate conveyor 14 opposite the end associated with the infeed conveyor 12. As disengagement occurs, the actuated lugs 32' may be automatically drawn out of the conveying path in a generally vertical direction as a result of the movement of the corresponding chain in the guide track 36 and the contour of the guide surface 72*b* at the opposite end of the support member 70. This disengagement allows the trailing end flap $F_3$ to return to at least a partially unfolded position (which occurs naturally, since the carton was initially formed from a generally planar blank including this flap).

Figure 8:
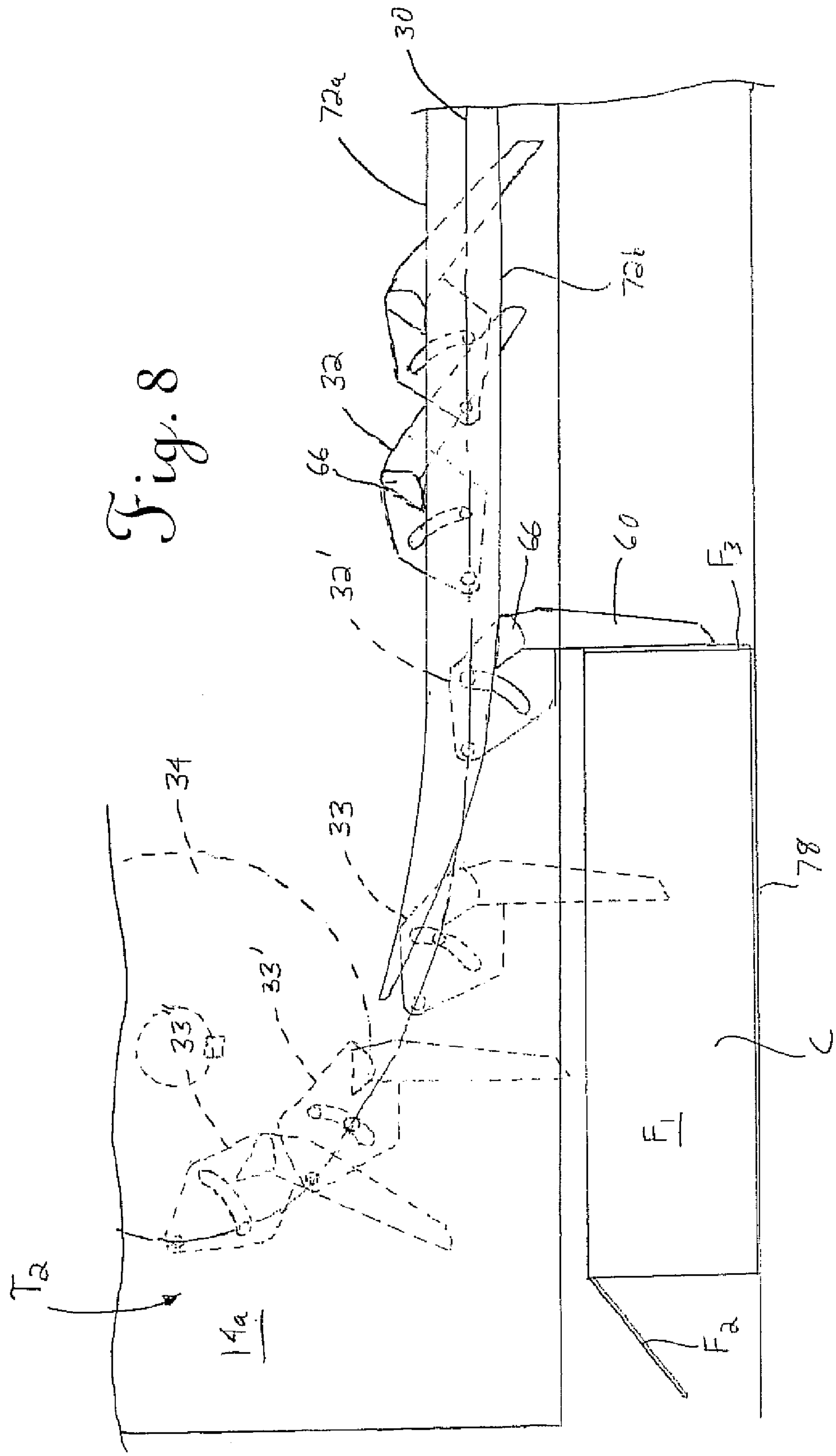
FIG. 8 is a partially cutaway, schematic side view illustrating the manner in which the actuated depending lugs are withdrawn at the discharge end of the intermediate conveyor.

More specifically describing the movement of the actuated lugs 32' at the discharge end of the intermediate conveyor 14, and with continued reference to FIG. 8, the guide structure 72 initially may continue to engage the transverse tab 66 of each lug 32. Toward the downstream end where the transition $T_2$ to the return or upper run U begins, the guide structure 72 also includes a curved or contoured surface 72*b* for engaging the tab 66. The contour of this surface 72*b* and the contour of the guide track 36 for the chain 30 are such that the movement to the retracted position is made in a gradual fashion. Consequently, the pusher 60 of the actuated lug 32' remains in a ready position until withdrawn from the conveying path and does not interfere with the orientation of the squared carton (note phantom positions 33 and 33'). In other words, the pusher 60 is withdrawn from the actuated or operative position (corresponding to lug position 32') in a generally vertical direction, at least until it is away from the path of the squared carton.

Also noteworthy is the fact that the withdrawal of the lugs 32 and return to the retracted position are also accomplished in a passive manner. This avoids the need for pivot blocks or like structures that actively engage and "kick back" the actuated lugs. The potential for breakage is thus reduced and the service life increased.

The guide structure 72 ultimately terminates, which in the "pop-down" version of the lug conveyors 14*a*, 14*b* allows the corresponding actuated lug 32 to rotate toward the retracted or home position slightly (note position 33"), such that pin 50*b* engages the upper end of the slot 52. However, as the corresponding chain 30 is driven forward over the sprocket 34 and toward the return/upper run U, the lug 32 is then rotated or pivoted in the opposite direction as the result of the combined centrifugal and gravitational forces acting on it (see FIGS. 3*a* and 3*b*). In terms of pivoting movement, the lug 32 ultimately comes to rest in the generally retracted or normal position, and remains in this position as the chain 30 is driven in an endless fashion until it is again selectively actuated by the diverter (e.g., finger 68).

Referring now to FIGS. 9-12, the carton upon being ejected from the intermediate conveyor 14 may engage a stop 106 and momentarily come to rest on a support surface S associated with the takeaway conveyor 16. The takeaway conveyor 16 is generally oriented with a conveying direction generally perpendicular to the intermediate conveyor 14, and is actually comprised of a pair of spaced, generally parallel lug conveyors 16*a*, 16*b*. Similar to the lug conveyors 14*a*, 14*b* of the intermediate conveyor 14, each lug conveyor 16*a*, 16*b* may include an endless chain 108 driven along a guide track 110 by a sprocket 112 associated with motor $M_5$. The chain 108 of each conveyor 16*a*, 16*b* carries a plurality of selectively actuatable lugs 132, which may be essentially identical to the lugs used in the intermediate conveyor 14 and thus are pivotally connected to the chain 108 by pins 150*a*, 150*b* (with pin 150*b* positioned in an arcuate slot 152 formed in the lug 132) in a closely spaced or overlapping fashion. The primary difference is that the lugs 132 are selectively actuated as the transition is made from a lower return run L to an upper forward run U to engage and convey the carton along the takeaway conveyor 16 (such as by way of engagement between the generally planar front face of the upstanding pusher 160 and the rear face of the carton).

Figure 11:
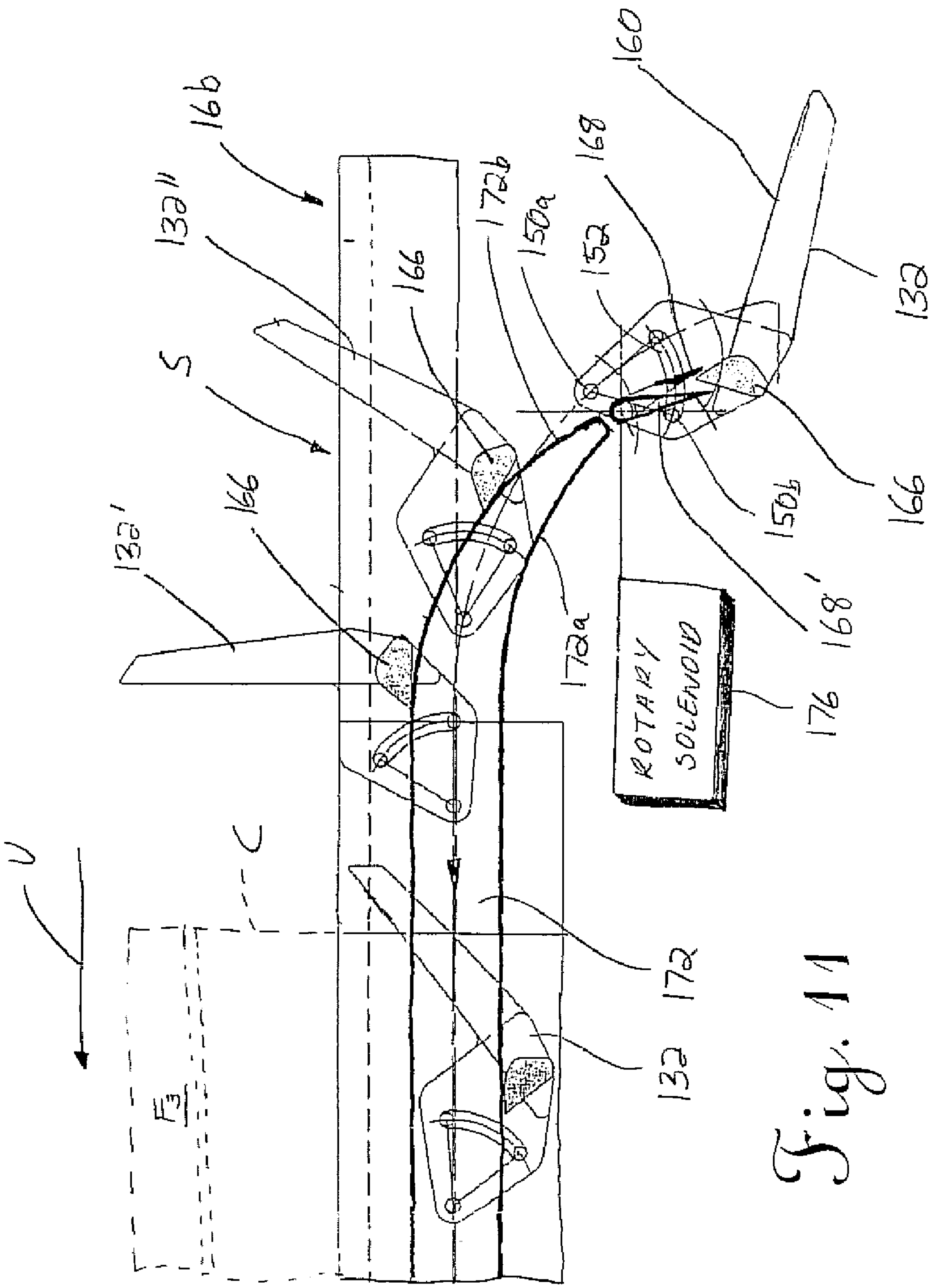
FIG. 11 is partially schematic side view illustrating the manner in which the lugs of the takeaway conveyor are selectively actuated to the upstanding position for engaging and conveying the partially formed carton while the remaining flaps are folded and sealed.
Figure 12:
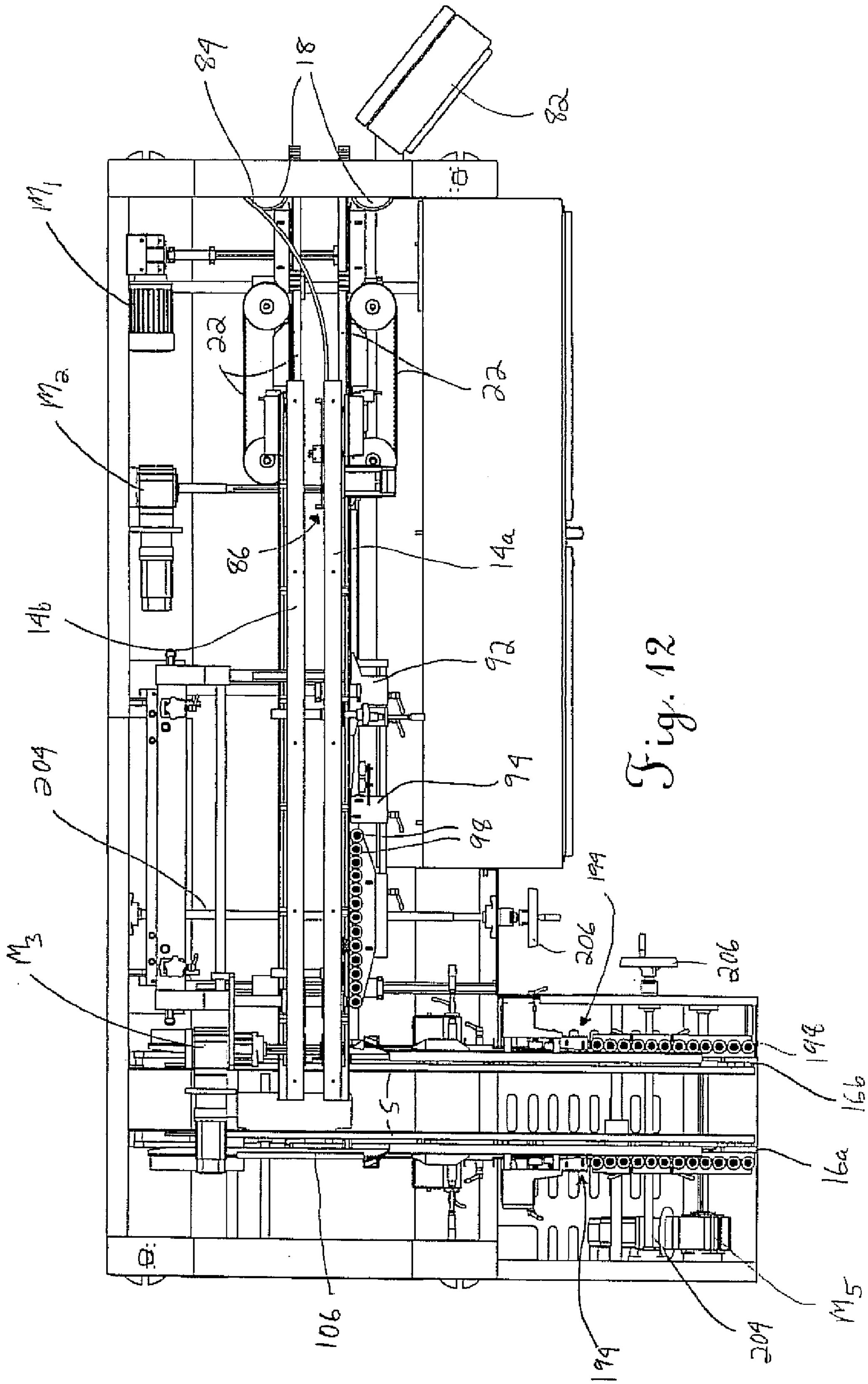
FIG. 12 is a top view of the machine showing the infeed conveyor and the positioning of the intermediate and takeaway conveyors generally perpendicular to each other.

As with the lugs of the intermediate conveyor 14, each may be selectively actuated by moving a diverter (such as a pivoting tapered finger 168 associated with a rotary solenoid 176; see the side schematic view of the upstream end of the lug conveyor 16*b* in FIG. 11) between a home or non-actuated position and an actuated position (which may be effected as the result of the controller 300, which may determine when the carton is on or adjacent to the takeaway conveyor 16, such as by the backstop 106, based on the known position of the carton C relative to the overhead conveyor 12, the known speed of travel, and the fixed travel distance). The finger 168 in a normal or home position guides the projection 166 on the lug 132 into engagement with a corresponding guide surface 172*a* of a guide member 172 and an actuated position 168' that guides the projection 166 into engagement with the opposite guide surface 172*b*. Consequently, the lug moves from the retracted position (132), to a partially pivoted position (132"), and ultimately to a fully actuated position (132'). Since the actuated lugs 132' engage the surface of the carton opposite the broad side flap $F_1$ in this preferred embodiment, no pre-folding step is necessary.

During conveyance along the takeaway conveyor 16 by the lugs 132, the side flaps are folded and sealed to complete the carton. As perhaps best shown in FIG. 9, an adhesive is applied to each side of the carton by a pair of spaced guns 190 (which may be triggered by sensor 180), and the narrow side flaps $F_2$, $F_3$ then pass a stationary plow 192. An assembly 194 includes one or more roller wheels 196 strategically positioned adjacent to each conveyor 16*a*, 16*b* for folding the flaps $F_2$, $F_3$ in association with the plows 192. The folded side flaps $F_2$, $F_3$ are then each engaged by serially arranged discs 198 that provide a slight compressive force and ensure a proper seal is formed as the adhesive sets. The glue gun 190, plow 192, roller wheels 196, and discs 198 maybe supported by mounts 200, including quick-release handles 202 (see FIG. 10) to facilitate manual height adjustment.

Advantageously, the immediate engagement resulting from selectively popping-up or extending the lugs 132 at the instant in time when the carton C with the registered, folded lid L reaches the takeaway conveyor 16 helps to improve the speed of the overall feeding and forming operation. Additionally, since the takeaway conveyor 16 is generally perpendicular to the intermediate conveyor 14, this most preferred arrangement avoids the need for an active mechanism, such as belts running at differential speeds, for turning the carton 90° (e.g., from a narrow side leading orientation with the side flaps in the leading and trailing positions to a "broadside leading" orientation) before an additional operation is performed (such as in a downstream flap closing section). This tends to reduce the amount of continuous floor space required by the machine 10 in any single direction and allows for a concomitant increase in throughput. As should be appreciated, the takeaway conveyor 16 may be positioned for conveying the cartons in either direction (that is, to the right of the machine 10 when facing that side, or to the left of the machine), depending on the particular environment of use.

In a preferred embodiment, the lugs 132 are withdrawn from the conveying path in the vertical direction (consider FIG. 8 inverted) while the carton is engaged by the wheels 198. As a result, the carton is not ejected from the takeaway conveyor 16 by the lugs 132. Instead, the engagement with the next-in-line completed carton serves to engage and eject the previously completed carton from the takeaway conveyor 16 (such as onto another conveyor; not shown). This vertical withdrawal prevents the lugs 132 from inadvertently damaging the cartons, which are merely ejected as a result of the slight push forward provided by the engagement by the next-in-line completed carton.

As should be appreciated, the use of small pitch, selectively actuated lugs allows for the machine 10 in the preferred embodiment to be readily adapted for use with cartons having different lengths in the conveying direction. In the preferred embodiment, the infeed conveyor 12, intermediate conveyor 14, and takeaway conveyors 16 are all adjustable to accommodate cartons of varying widths. For example, the intermediate 14 and takeaway conveyors 16 may be provided with jackscrews 204 that are manually controlled by hand wheels 206 to adjust the spacing of the lug conveyors 14*a*, 14*b;* 16*a*, 16*b*. Preferably, the actuation point for the lugs 132 on the takeaway lug conveyors 16*a*, 16*b* is sufficiently far upstream to accommodate a significant increase in the spacing of the intermediate lug conveyors 14*a*, 14*b*. To avoid the need for adjusting the position of the corresponding motors, the output shafts may be telescopingly connected to the drive shafts associated with the sprockets 34, 112 via splined interface. Instead of manually operated jack screws, automated linear actuators or ball screws may also be used for adjusting the spacing of the lug conveyors 14*a*, 14*b;* 16*a*, 16*b* to accommodate the cartons (in which case the adjustments could also be made automatically based on operator input via touch screen 82).

It is also possible to provide a similar motive device (e.g., linear actuator or jack screw) for adjusting the vertical position of the overhead lug conveyors 14*a*, 14*b* relative to the support surface, such as guide rails 78, to accommodate cartons having increased heights. The range of adjustment in the machine of the preferred embodiment may be limited by the fact that the lugs 32 are of fixed length. To avoid this, it maybe possible to use lugs that, in the extended condition, extend through the space provided between the guide rails 78. A significant height adjustment to the conveyor 14 could then be made with the lugs still extending well into the conveying path.

Figure 13:
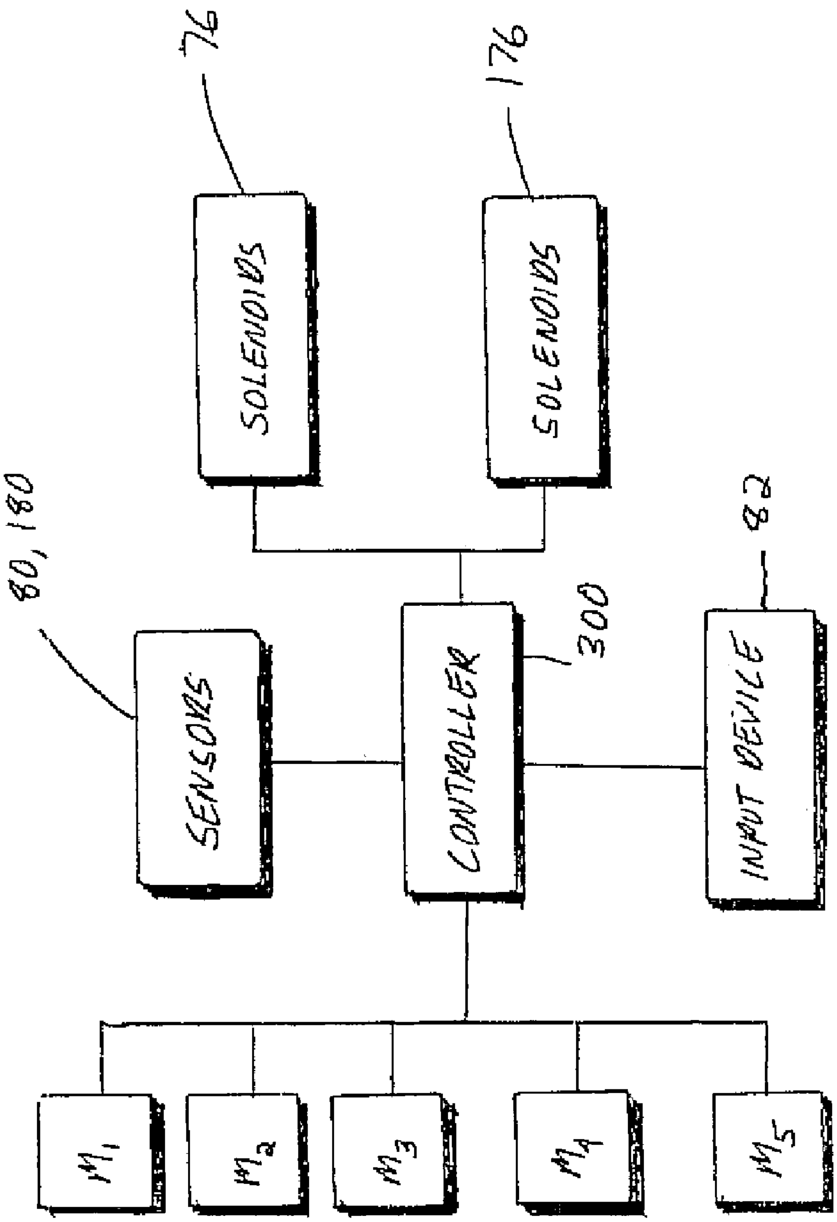
FIG. 13 is a block diagram showing the interrelationship between the controller for the machine and the various components thereof.

FIG. 13 is a block diagram illustrating the associations maintained between the controller 300, the input device (such as touch screen 82), and the various motors, sensors, and rotary solenoids. As should be appreciated, the controller 300 may be an onboard computer programmed to receive input from the sensors and the input device and provide corresponding output to the motors and solenoids to control the speed/throughput and operation of the machine 10, as well as the actuation of the diverters.

Although the arrangement described above as the preferred embodiment includes the pre-folding wheel 86, it is also possible to use the machine 10 without this structure and to practice a related method of feeding and forming cartons. Instead, the feeding of the cartons could be regulated such that the instant in time when the trailing end flap $F_3$ is in a proper position for folding is known. The selected lugs 32 could then be actuated at regular intervals to contact this flap $F_3$ at that instant in time to fold it, and then convey the carton along with this flap held in the folded condition. In other words, the pop-down lugs 32 could be used to both fold the trailing end flap $F_3$ and convey the carton. In the case where the lugs 32 are overlapping or very closely spaced, the small pitch would allow for actuation very close to the instant in time when the flap $F_3$ is in the optimum position for folding. The use of pop-down lugs 32 is also advantageous in this situation, since the lug 32 during actuation contacts the strong planar upper surface of the flap $F_3$, as opposed to the weaker edge (as would occur with pop-up lugs). While this proposal obviously simplifies the machine 10 in some respects, it complicates the overall process by requiring timed infeed of the cartons. It also tends to slow the carton forming process, as compared to the random feed approach. Thus, it may be desirable only when warranted by the particular circumstances.

Another approach is to use a bottom-running lug conveyor (not shown) in concert with the overhead conveyor 14. The lugs of the bottom running conveyor may have their engagement faces oriented towards the infeed end and engage the leading end of an introduced carton. In addition to squaring the carton, the upstanding lugs could be used to provide a temporary hold back function while the depending lugs are actuated to engage the trailing end flap and convey the carton. The upstanding lugs could then be withdrawn from the conveying path. It is also possible to use a single overhead lug conveyor in such an arrangement.

Briefly summarizing the foregoing, a machine 10 for intended use in feeding and completing partially formed cartons is disclosed. The machine 10 includes an overhead conveyor 14 that receives partially formed and filled cartons C from an infeed conveyor 12. The conveyor 14 includes lugs 32 that in a selectively actuated, depending position (32') engage and convey the carton C in a first direction while a first flap $F_1$ on a lid L or closure is folded. A takeaway conveyor 16 includes lugs 132 that in a selectively actuated, upstanding position convey the carton in a second direction generally perpendicular to the first direction while second and third flaps $F_2$, $F_3$ on the lid L are folded. The lugs 32, 132 may be closely spaced or overlapping to allow for selective actuation at a desired instant in time for engaging a carton or other object introduced into the conveying path. A diverter including a tapered finger 68 or 168 is provided at a transition between the forward and return runs of the overhead and takeaway conveyors to actuate the lugs 32, 132.

The foregoing description has been presented for purposes of illustration and description. It is not intended to be exhaustive or to limiting. For example, the closely spaced or overlapping lugs may be used for conveying or engaging objects being conveyed in other types of carton feeding and forming machines (such as those with belts traveling at differential speeds to provide the turning function), as well as in machines besides carton feeding and forming machines. Also, although the use of static folding structures (e.g., plows and wheels) is preferred for sake of simplicity, the use of other means for folding/sealing is possible. For example, movable devices (e.g., extensible fingers) could be used for folding the side flaps $F_1$, $F_2$, $F_3$ as the carton is conveyed along. Instead of using a glue gun, cartons with pre-applied, heat-activated adhesives or coatings could also be used (in which case the "gun" would instead supply focused, heated air to activate the adhesive or coating in advance of the folding of the corresponding flap). The embodiments described to provide an illustration of the inventive principles and the practical application thereof sufficient to enable one of ordinary skill in the art to utilize them in various other embodiments and with various modifications, as are suited to the particular use contemplated. All such modifications and variations are within the scope of the invention as determined by the appended claims when interpreted in accordance with the breadth to which they are fairly, legally and equitably entitled.

The invention claimed is:

1. A driven conveyor for selectively engaging an object capable of moving in a conveying direction, comprising:

a plurality of lugs, each capable of moving from a normal position to an actuated position in which at least part of the lug extends in a generally vertical direction for engaging the object; and a diverter for selectively diverting a selected lug in the normal position to the actuated position, wherein at least a portion of a first lug overlaps with at least a portion of a second, adjacent lug in one of the conveying direction or a direction generally transverse to both the conveying direction and the vertical direction when the first and second lugs are in the normal position, and the portion of the first lug in the normal position overlaps with the portion of the second lug in the actuated position.

2. The conveyor according to claim 1, wherein the lugs are structurally identical.

3. The conveyor according to claim 1, further including an endless chain carrying and connecting the lugs, each foot of chain as measured in the conveying direction including at least four lugs.

4. The conveyor according to claim 1, wherein a distance from a corresponding point on each of the first and second lugs in the normal position measured in the conveying direction is about 2.5 inches or less.

5. The conveyor according to claim 1, wherein the first lug comprises a leading lug.

6. The conveyor according to claim 1, wherein the first and second lugs are spaced apart a distance no greater than a width of a single lug in the conveying direction when in the actuated position.

7. The conveyor according to claim 1, wherein the part of each lug extending in the generally vertical direction is a pusher having an engagement face adapted for engaging the object being conveyed, wherein the engagement face is generally perpendicular to the conveying direction when the corresponding lug is in the actuated position.

8. The conveyor according to claim 1, wherein the pusher of the first lug in the normal position is the portion overlapping with the portion of the second lug in the conveying direction.

9. The conveyor according to claim 1, wherein the engagement face of the pusher extends at an acute angle relative to a generally horizontal plane when the corresponding lug is in the retracted position.

10. The conveyor according to claim 1, wherein the pusher is upstanding relative to the conveyor when the corresponding lug is in the actuated position.

11. The conveyor according to claim 1, wherein the pusher is depending from the conveyor when the corresponding lug is in the actuated position.

12. The conveyor according to claim 1, wherein the movement from the normal position to the actuated position is pivoting such that a point on the lug follows a generally arcuate path.

13. The conveyor according to claim 1, wherein the diverter includes a tapered finger having opposed sides and further including a rotary solenoid for rotating the finger between a first position and a second position.

14. The conveyor according to claim 13, wherein the diverter further includes a guide structure having a first surface and a second surface, wherein the finger in the first position allows the lugs to pass in the normal position and in the second position selectively engages and guides a portion of the lug into engagement with the second surface.

15. The conveyor according to claim 13, wherein portion of the lug includes: (1) an inclined first face for engaging a first side of the finger in the first position and the first surface of the guide structure; and (2) a generally flat second face for engaging a second side of the finger in the second position and the second surface of the guide structure.

16. The conveyor according to claim 15, wherein the engagement with the second side of the finger pivots the selected lug approximately 10°.

17. The conveyor according to claim 15, wherein the engagement with the second surface of the guide structure pivots the selected lug approximately 50°.

18. The conveyor according to claim 1, wherein each lug includes a slot for receiving a pin associated with a chain interconnecting the lugs, wherein the slot defines a maximum range of pivoting movement for the lug.

19. A driven conveyor for selectively engaging an object capable of moving in a conveying direction along a conveying path, comprising:

a plurality of lugs capable of moving from a normal to an actuated position such that a part of the lug extends vertically into the conveying path for engaging the object; and a diverter elongated in the conveying direction and capable of moving from a first position to a second position for engaging and initiating movement of a selected lug to the actuated position;

an actuator for selectively moving the diverter toward the second position; and a guide structure for maintaining the selected lug in the actuated position for engaging the object;

wherein at least a portion of a first lug overlaps with at least a portion of the second lug in one of the conveying direction or a direction generally transverse to both the conveying direction and the vertical direction, when the first and second lugs are in a normal position.

20. A driven conveyor for selectively engaging an object capable of moving in a conveying direction, comprising:

a plurality of lugs, each capable of moving from a normal position to an actuated position in which at least part of the lug extends in a generally vertical direction for engaging the object;

an endless chain carrying and connecting the lugs, each foot of chain as measured in the conveying direction including at least four lugs; and a diverter for selectively diverting a selected lug in the normal position to the actuated position, wherein at least a portion of a first lug overlaps with at least a portion of a second, adjacent lug in one of the conveying direction or a direction generally transverse to both the conveying direction and the vertical direction when the first and second lugs are in the normal position.

21. A driven conveyor for selectively engaging an object capable of moving in a conveying direction, comprising:

a plurality of lugs, each capable of moving from a normal position to an actuated position in which at least part of the tug extends in a generally vertical direction for engaging the object; and a diverter for selectively diverting a selected lug in the normal position to the actuated position, wherein at least a portion of a first lug in the normal position overlaps with at least a portion of a second, adjacent lug in the actuated position.

22. A driven conveyor for selectively engaging an object capable of moving in a conveying direction, comprising:

a plurality of lugs, each capable of moving from a normal position to an actuated position in which at least part of the lug extends in a generally vertical direction for engaging the object; and a diverter including a tapered finger having opposed sides and further including a rotary solenoid for rotating the finger between a first position and a second position for selectively diverting a selected lug in the normal position to the actuated position, wherein at least a portion of a first lug overlaps with at least a portion of a second, adjacent lug in one of the conveying direction or a direction generally transverse to both the conveying direction and the vertical direction when the first and second lugs are in the normal position.

23. A driven conveyor for selectively engaging an object capable of moving in a conveying direction, comprising:

a conveying surface;

a plurality of lugs arranged in tandem, each capable of moving from a normal position below the conveying surface to an actuated position in which at least part of the lug extends in a generally vertical direction above the conveying surface for engaging the object; and a diverter for selectively diverting a selected lug in the normal position to the actuated position, wherein at least a portion of a first lug overlaps with at least a portion of a second, consecutive lug in the conveying direction at least when the first and second lugs are in the normal position.

* * * * *